US00RE47693E

(19) United States
(12) Reissued Patent
Gosling et al.

(10) Patent Number: US RE47,693 E
(45) **Date of Reissued Patent: *Nov. 5, 2019**

(54) INTEGRATED RECONFIGURABLE WALL SYSTEM

(71) Applicant: DIRTT Environmental Solutions, Ltd., Calgary (CA)

(72) Inventors: Geoff Gosling, Calgary (CA); Mogens Smed, DeWinton (CA)

(73) Assignee: DIRTT Environmental Solutions, Ltd., Calgary (CA)

( * ) Notice: This patent is subject to a terminal disclaimer.

(21) Appl. No.: 15/074,383

(22) Filed: Mar. 18, 2016

Related U.S. Patent Documents

Reissue of:
(64) Patent No.: 8,024,901
Issued: Sep. 27, 2011
Appl. No.: 11/205,314
Filed: Aug. 17, 2005

U.S. Applications:
(63) Continuation of application No. 14/032,931, filed on Sep. 20, 2013, which is an application for the reissue of Pat. No. 8,024,901.

(Continued)

(51) Int. Cl.
*E04H 1/00* (2006.01)
*E04B 1/00* (2006.01)
*E04B 2/74* (2006.01)

(52) U.S. Cl.
CPC ..... *E04B 2/7424* (2013.01); *E04B 2002/742* (2013.01); *E04B 2002/749* (2013.01);

(Continued)

(58) Field of Classification Search
CPC ..... E04B 2002/7462; E04B 2002/7483; E04B 2002/742; E04B 2002/749; E04B 2/7424
See application file for complete search history.

(56) References Cited

U.S. PATENT DOCUMENTS 2,042,290 A 5/1936 Barrett
2,658,810 A 11/1953 Ellis (Continued)

FOREIGN PATENT DOCUMENTS

CA 55086 10/1985
CA 1294107 11/1987

(Continued)

OTHER PUBLICATIONS

Non-Final Office Action for U.S. Appl. No. 14/681,874 dated Jun. 15, 2016.

(Continued)

*Primary Examiner* — Jeffrey L Gellner
(74) *Attorney, Agent, or Firm* — Workman Nydegger

(57) ABSTRACT

A movable reconfigurable wall system having at least one module having a front and rear surface, the at least one module having: vertical end frames disposed at least at its side edges, each the vertical end frame having a vertically extending flange directed toward the front surface and a vertically extending flange directed toward the rear surface; a plurality of horizontal stringers affixed between the pair of vertical end frames; and an aesthetic surface affixed to the stringers; and a removable connecting strip, the connecting strip adapted to affix about one of the two flanges on one of the vertical end frames and join the one of the two flanges to a corresponding flange on one of a second module, a wall bracket, a finishing trim or a connection post.

94 Claims, 22 Drawing Sheets

Related U.S. Application Data

(60) Provisional application No. 60/601,985, filed on Aug. 17, 2004.

(52) U.S. Cl.
CPC ..... *E04B 2002/7462* (2013.01); *E04B 2002/7483* (2013.01)

(56) References Cited

U.S. PATENT DOCUMENTS 2,676,481 A 4/1954 Hoffman
3,037,593 A 6/1962 Webster
3,088,127 A 5/1963 Charles
3,180,457 A 4/1965 Bohnsack
3,521,937 A 7/1970 Buhrmaster
3,602,226 A 9/1971 Ericson
3,621,635 A 11/1971 Lange
3,675,382 A 7/1972 Lickliter
3,696,569 A 10/1972 Didry
3,885,361 A 5/1975 De Schutter
4,027,878 A 6/1977 Dadbeh
4,103,373 A 8/1978 Luedtke
4,128,983 A 12/1978 Matsubara
4,277,920 A 7/1981 Dixon
4,438,614 A 3/1984 Raith
4,449,337 A 5/1984 Gzym
4,493,172 A 1/1985 Jones
4,535,577 A 8/1985 Tenser
4,631,881 A 12/1986 Charman
4,688,491 A 8/1987 Herrera
4,752,101 A 6/1988 Yurchenco
4,757,657 A 7/1988 Mitchell
D302,497 S 8/1989 Zapf
D309,381 S 7/1990 Buhk
D309,382 S 7/1990 Randall
D309,384 S 7/1990 Buhk
D309,385 S 7/1990 Buhk
D309,386 S 7/1990 Buhk
4,991,365 A 2/1991 Jackson
5,038,539 A 8/1991 Kelley
5,056,285 A 10/1991 Frascaroli
D321,801 S 11/1991 Friedman
5,064,247 A 11/1991 Clark
D323,251 S 1/1992 Zapf
5,086,597 A 2/1992 Kelley
D325,309 S 4/1992 Worrell
5,117,599 A 6/1992 Voss
D327,794 S 7/1992 Zapf
D328,680 S 8/1992 Zapf
5,144,777 A 9/1992 Fishel
D330,295 S 10/1992 Zapf
5,155,955 A 10/1992 Ball
D330,641 S 11/1992 Zapf
D330,643 S 11/1992 Zapf
5,159,793 A 11/1992 Deugo
D331,335 S 12/1992 Zapf
D331,513 S 12/1992 Zapf
5,171,060 A 12/1992 Kaye
5,172,530 A 12/1992 Fishel
5,184,441 A 2/1993 Balfanz
5,204,149 A 4/1993 Phenicie
5,207,037 A 5/1993 Giles
5,218,799 A 6/1993 Appino
D337,003 S 7/1993 Rowland
5,227,005 A 7/1993 Zodrow et al.
5,321,579 A 6/1994 Brown
D348,786 S 7/1994 Tolleson
5,351,452 A 10/1994 Gates
5,352,033 A 10/1994 Gresham
5,394,668 A 3/1995 Lim
5,488,808 A 2/1996 Cahill
D371,683 S 7/1996 Tolleson
5,544,593 A 8/1996 Canfield
5,592,794 A 1/1997 Tundaun
5,600,926 A * 2/1997 Ehrlich ..... 52/239
5,601,348 A 2/1997 Minkovski
5,642,593 A 7/1997 Shieh
5,669,314 A 9/1997 Grant
5,740,644 A 4/1998 Menchetti
5,740,650 A 4/1998 Seiber
5,740,744 A 4/1998 Nashirozawa
5,746,035 A 5/1998 Seiber
5,792,541 A 8/1998 Herrera
D397,880 S 9/1998 Saul
D398,464 S 9/1998 Cronk
5,802,789 A 9/1998 Goodman
5,813,178 A 9/1998 Edwards
5,822,935 A 10/1998 Mitchell
5,826,385 A 10/1998 Dykstra
5,836,121 A 11/1998 Hofman
5,839,240 A 11/1998 Eisholz
5,852,904 A 12/1998 Yu
5,870,867 A 2/1999 Mitchell
5,875,596 A 3/1999 Muller
5,881,979 A * 3/1999 Rozier, Jr. ..... A47B 91/024 248/188.4
5,913,787 A 6/1999 Edwards
5,931,429 A * 8/1999 Hellwig ..... A47B 5/06 108/108
5,950,386 A 9/1999 Shipman
5,978,988 A 11/1999 Burchett
6,012,258 A 1/2000 Brown
6,047,508 A 4/2000 Goodman
6,058,667 A 5/2000 MacDonald
6,094,872 A 8/2000 Ward
6,112,472 A 9/2000 Van Dyk
6,122,871 A 9/2000 Russell
6,128,877 A 10/2000 Goodman
6,134,845 A 10/2000 Shipman
6,141,926 A 11/2000 Rossiter
6,158,179 A 12/2000 Ackerly
6,161,347 A 12/2000 Yu
6,189,270 B1 2/2001 Jeffers
6,223,485 B1 5/2001 Beck
6,250,020 B1 6/2001 Shipman
6,250,032 B1 * 6/2001 Davis et al. ..... 52/239
6,260,321 B1 * 7/2001 Rudduck ..... 52/474
6,282,854 B1 * 9/2001 Vos et al. ..... 52/239
6,295,764 B1 10/2001 Berrdige
6,301,846 B1 10/2001 Waalkes
6,311,441 B1 11/2001 Beavers
6,330,773 B1 12/2001 MacDonald
6,341,457 B1 * 1/2002 Aerts et al. ..... 52/239
6,363,663 B1 4/2002 Kane
6,393,782 B1 5/2002 Berrdige
6,393,783 B2 5/2002 Emaus
6,397,533 B1 6/2002 Hornberger
6,415,567 B1 7/2002 Mead
6,446,396 B1 9/2002 Marangoni
6,481,168 B1 * 11/2002 Hodges et al. ..... 52/220.7
6,484,465 B2 11/2002 Higgins
6,490,154 B2 12/2002 Thompson
6,497,075 B1 12/2002 Schreiner
6,530,181 B1 3/2003 Seiber
6,557,310 B2 5/2003 Marshall
6,571,855 B1 6/2003 Goldsmith
6,581,344 B1 6/2003 Niewiadomski
6,591,563 B2 7/2003 King
6,612,077 B2 9/2003 Parshad
6,619,008 B1 9/2003 Shivak
6,658,805 B1 12/2003 Yu
6,668,514 B2 12/2003 Skov
D485,096 S 1/2004 Overthun
6,684,929 B2 2/2004 MacDonald
6,688,056 B2 2/2004 Von Hoyningen Huene
6,701,677 B2 3/2004 Gresham
6,711,871 B2 3/2004 Beirise
6,729,085 B2 5/2004 Newhouse
6,748,710 B2 6/2004 Gresham
6,775,953 B2 8/2004 Burken
6,799,404 B2 10/2004 Spransy
6,807,776 B2 10/2004 Girdwood
6,820,388 B2 11/2004 Newhouse
6,851,226 B2 2/2005 MacGregor

(56) References Cited

U.S. PATENT DOCUMENTS

| | | | | |
|---|---|---|---|---|
| 6,865,853 | B2 | 3/2005 | Burken | |
| 6,883,277 | B2 | 4/2005 | Wiechecki | |
| 6,889,477 | B1 | 5/2005 | Kottman | |
| 6,920,727 | B2 * | 7/2005 | Yu et al. | 52/239 |
| 6,928,785 | B2 | 8/2005 | Shipman | |
| 6,941,716 | B2 | 9/2005 | Kottman | |
| 6,944,993 | B1 | 9/2005 | Jilk | |
| 6,951,085 | B2 | 10/2005 | Hodges | |
| 6,964,138 | B2 | 11/2005 | Carroll | |
| 6,981,454 | B2 | 1/2006 | Burdick | |
| 6,990,909 | B2 | 1/2006 | Gosling | |
| 6,993,875 | B2 | 2/2006 | Rudduck | |
| 7,051,482 | B2 | 5/2006 | MacDonald | |
| 7,150,127 | B2 | 12/2006 | Underwood | |
| 7,210,270 | B1 | 5/2007 | King | |
| 7,310,918 | B1 | 12/2007 | Reuter | |
| 7,434,790 | B1 | 10/2008 | Hansen | |
| 7,451,577 | B2 | 11/2008 | Little | |
| 7,461,484 | B2 | 12/2008 | Battey | |
| 7,540,115 | B2 | 6/2009 | Metcalf | |
| 7,562,504 | B2 | 7/2009 | Herbst | |
| 7,603,821 | B2 | 10/2009 | Eberlein | |
| 7,644,552 | B2 | 1/2010 | Kuipers | |
| 7,661,237 | B2 | 2/2010 | Jakob-Bamberg | |
| 7,707,790 | B2 | 5/2010 | Williams | |
| 7,818,932 | B2 | 10/2010 | Eberlein | |
| 7,827,745 | B2 | 11/2010 | Franceschet | |
| 7,832,154 | B2 | 11/2010 | Gosling | |
| 7,841,142 | B2 | 11/2010 | Towersey | |
| 7,856,777 | B2 | 12/2010 | Lamfers | |
| 7,861,474 | B2 | 1/2011 | Houle | |
| 7,891,148 | B2 | 2/2011 | Underwood | |
| 7,908,805 | B2 | 3/2011 | Metcalf | |
| 7,913,459 | B2 | 3/2011 | Ball | |
| 7,918,064 | B2 | 4/2011 | Singleton | |
| 7,922,224 | B2 | 4/2011 | Arias | |
| 7,984,598 | B2 | 7/2011 | Gosling | |
| 8,015,766 | B2 | 9/2011 | Gosling | |
| 8,015,767 | B2 | 9/2011 | Glick | |
| 8,024,901 | B2 | 9/2011 | Gosling | |
| 8,033,059 | B2 | 10/2011 | Contois | |
| 8,033,068 | B2 | 10/2011 | Luttmann | |
| 8,046,957 | B2 | 11/2011 | Towersey | |
| 8,151,527 | B2 | 4/2012 | Gosling | |
| 8,151,533 | B2 | 4/2012 | Krieger | |
| 8,176,707 | B2 | 5/2012 | Gosling | |
| 8,215,061 | B2 | 7/2012 | Gosling | |
| 8,272,180 | B2 | 9/2012 | Glick | |
| 8,307,591 | B2 | 11/2012 | Steinle | |
| 8,322,102 | B2 | 12/2012 | Krieger | |
| 8,393,122 | B2 | 3/2013 | Henriott | |
| 8,474,193 | B2 | 7/2013 | Sutton | |
| 8,479,026 | B2 | 7/2013 | Lakshmanan | |
| 8,534,021 | B2 | 9/2013 | Liu | |
| 8,601,749 | B2 | 12/2013 | Von Hoyningen Huene | |
| 8,613,168 | B2 | 12/2013 | Von Hoyningen Huene | |
| 8,615,936 | B2 | 12/2013 | Von Hoyningen Huene | |
| 8,656,648 | B2 | 2/2014 | Liegeois | |
| 8,683,745 | B2 | 4/2014 | Artwohl | |
| D710,025 | S | 7/2014 | Johnson | |
| 8,910,435 | B2 | 12/2014 | Feldpausch | |
| D725,638 | S | 3/2015 | Hofman | |
| 8,966,839 | B2 | 3/2015 | Rebman | |
| 9,003,731 | B2 | 4/2015 | Gosling | |
| D731,833 | S | 6/2015 | Fifield | |
| 9,084,489 | B2 | 7/2015 | Gosling | |
| 9,206,600 | B2 | 12/2015 | Von Hoyningen Huene | |
| 9,284,729 | B2 | 3/2016 | Von Hoyningen Huene | |
| 2001/0039774 | A1 | 11/2001 | Beirise | |
| 2002/0053174 | A1 | 5/2002 | Barmark | |
| 2002/0104271 | A1 | 8/2002 | Gallant | |
| 2002/0108330 | A1 * | 8/2002 | Yu et al. | 52/238.1 |
| 2002/0121056 | A1 | 9/2002 | Von Hoyningen | |
| 2002/0124514 | A1 | 9/2002 | Higgins | |
| 2002/0129574 | A1 | 9/2002 | Newhouse | |
| 2002/0144476 | A1 | 10/2002 | Mastelli | |
| 2002/0157335 | A1 | 10/2002 | Vos | |
| 2003/0005514 | A1 | 1/2003 | Kunkel | |
| 2003/0060080 | A1 | 3/2003 | Rees | |
| 2003/0089057 | A1 * | 5/2003 | Wiechecki et al. | 52/238.1 |
| 2003/0154673 | A1 | 8/2003 | Macgregor | |
| 2003/0196388 | A1 | 10/2003 | Edwards | |
| 2003/0221384 | A1 | 12/2003 | Burken et al. | |
| 2004/0010998 | A1 | 1/2004 | Turco | |
| 2004/0020137 | A1 * | 2/2004 | Battey et al. | 52/36.1 |
| 2004/0035074 | A1 | 2/2004 | Stanescu et al. | |
| 2004/0093805 | A1 | 5/2004 | Underwood | |
| 2004/0177573 | A1 * | 9/2004 | Newhouse et al. | 52/239 |
| 2005/0005527 | A1 | 1/2005 | Metcalf | |
| 2005/0086871 | A1 | 4/2005 | MacGregor | |
| 2006/0042141 | A1 | 3/2006 | Hansen | |
| 2006/0048457 | A1 | 3/2006 | Yang | |
| 2006/0059806 | A1 | 3/2006 | Gosling et al. | |
| 2006/0185276 | A1 | 8/2006 | Pai | |
| 2007/0277449 | A1 | 12/2007 | Bums | |
| 2007/0289225 | A1 | 12/2007 | Kern | |
| 2008/0069632 | A1 | 3/2008 | Gosling | |
| 2008/0295426 | A1 | 12/2008 | Milligan | |
| 2008/0302054 | A1 | 12/2008 | Gosling | |
| 2009/0021122 | A1 | 1/2009 | Green | |
| 2009/0241437 | A1 | 10/2009 | Steinle | |
| 2009/0260311 | A1 | 10/2009 | Boyer | |
| 2009/0293406 | A1 | 12/2009 | Gosling | |
| 2010/0043142 | A1 | 2/2010 | Whitford | |
| 2010/0192511 | A1 | 8/2010 | Gosling | |
| 2010/0223857 | A1 | 9/2010 | Sutton | |
| 2010/0307086 | A1 | 12/2010 | Hibbs | |
| 2011/0197519 | A1 | 8/2011 | Henriott | |
| 2012/0186164 | A1 | 7/2012 | Pensi | |
| 2012/0317899 | A1 | 12/2012 | Von Hoyningen Huene | |
| 2014/0102021 | A1 | 4/2014 | Gosling | |
| 2014/0310873 | A1 | 10/2014 | Gosling | |
| 2015/0007516 | A1 | 1/2015 | Glick | |
| 2015/0354212 | A1 | 12/2015 | Von Hoyningen Huene | |
| 2016/0032644 | A1 | 2/2016 | Geller | |
| 2016/0053485 | A1 | 2/2016 | Von Hoyningen Huene | |

FOREIGN PATENT DOCUMENTS

| | | |
|---|---|---|
| CA | 2011977 | 10/1990 |
| CA | 2002674 | 5/1991 |
| CA | 2040822 | 11/1991 |
| CA | 2162300 | 5/1997 |
| CA | 2273631 | 10/2001 |
| CA | 2324050 | 4/2002 |
| CA | 2348060 | 11/2002 |
| CA | 2359165 | 4/2003 |
| CA | 2310869 | 8/2003 |
| CA | 2476368 | 1/2006 |
| CA | 2428593 | 8/2007 |
| CA | 2359547 | 2/2008 |
| CA | 2591176 | 12/2008 |
| CA | 2634407 | 12/2008 |
| CA | 2349964 | 10/2009 |
| CA | 2840843 | 12/2013 |
| CA | 2535213 | 4/2014 |
| CA | 2863783 | 4/2014 |
| CH | 686795 | 6/1996 |
| CN | 202069245 | 12/2011 |
| DE | 1659015 | 11/1971 |
| DE | 4207753 | 9/1993 |
| DE | 69316247 | 7/1998 |
| DE | 19960535 | 6/2001 |
| DE | 202004017808 | 1/2005 |
| EP | 0302564 | 2/1989 |
| EP | 0443202 | 8/1991 |
| EP | 0557092 | 1/1998 |
| EP | 0963719 | 12/1999 |
| EP | 1094167 | 4/2001 |
| EP | 2736382 | 6/2014 |
| FR | 1526637 | 5/1968 |
| GB | 1259347 | 1/1972 |
| GB | 1400613 | 7/1975 |
| GB | 2221946 | 2/1990 |

(56) References Cited

FOREIGN PATENT DOCUMENTS

| | | |
|---|---|---|
| GB | 2283071 | 4/1995 |
| GB | 2353541 | 10/2003 |
| JP | HO317333 | 1/1991 |
| JP | 2003105908 | 4/2003 |
| JP | 2005155223 | 6/2005 |
| KR | 20000049102 | 7/2000 |
| KR | 1020070077502 | 7/2007 |
| WO | WO9212074 | 7/1992 |
| WO | WO9212300 | 7/1992 |
| WO | WO9315970 | 8/1993 |
| WO | WO9323629 | 11/1993 |
| WO | WO9402695 | 2/1994 |
| WO | WO9633323 | 10/1996 |
| WO | WO9746770 | 12/1997 |
| WO | WO9807357 | 2/1998 |
| WO | WO9816699 | 4/1998 |
| WO | WO9829623 | 7/1998 |
| WO | WO9837292 | 8/1998 |
| WO | WO9851876 | 11/1998 |
| WO | WO9946453 | 9/1999 |
| WO | WO9946455 | 9/1999 |
| WO | WO9946458 | 9/1999 |
| WO | WO9953156 | 10/1999 |
| WO | WO9958780 | 11/1999 |
| WO | WO9963177 | 12/1999 |
| WO | WO0015918 | 3/2000 |
| WO | WO0075447 | 12/2000 |
| WO | WO0171241 | 9/2001 |
| WO | WO0208851 | 1/2002 |
| WO | WO02052111 | 4/2002 |
| WO | WO02103129 | 12/2002 |
| WO | WO2003071045 | 8/2003 |
| WO | W02003104581 | 12/2003 |
| WO | WO2006127804 | 11/2006 |
| WO | WO2010121788 | 10/2010 |
| WO | WO2012173930 | 12/2012 |
| WO | WO2013101298 | 7/2013 |
| WO | WO2013130871 | 9/2013 |
| WO | WO2013185141 | 12/2013 |
| WO | WO2013188211 | 12/2013 |
| WO | WO2013188235 | 12/2013 |
| WO | 2014039278 | 3/2014 |
| WO | WO2014055883 | 4/2014 |

OTHER PUBLICATIONS

Non-Final Office Action for U.S. Appl. No. 14/305,819, dated Jul. 11, 2017.
Restriction Requirement for U.S. Appl. No. 14/683,684, dated Oct. 5, 2017.
Final Written Decision (IPR2015-01691), *Allsteal* v. *DIRTT Environemtnal Solutions* dated Jan. 19, 2017.
International Search Report and Written Opinion for PCT/US2012/041906 dated Jan. 31, 2013.
European Search Report, EP 12800672, dated Oct. 16, 2014.
International Search Report and Written Opinion for PCT/US2012/042314 dated Jun. 13, 2012.
European Search Report for PCT/US2012/042314 dated Jan. 29, 2015.
Office Action for U.S. Appl. No. 14/032,931 dated Jul. 16, 2015.
Petition for Inter Partes Review of U.S. Pat. No. 8,024,901, IPR2015-01690, filed Aug 7, 2015.
Genius Architectural Walls, [Publication Date Unlisted], Copyright Date 2004 by KI, Document Code KI-00473/HC/IT/PP/504.
KI Improves STC Rating on its Genius Architectural Wall and receives ICC approval, [Publication Date Unlisted], dated Feb. 26, 2004.
Lifespace Environmental Wall Systems, [Publication Date Unlisted], Dated Apr. 1995.
Press Release—"KI unveils Genius Full Heigth Movable Wall Microsite with new interactive features", Accessed on Aug. 14, 2015 at http://web.archive.org/web/20040506230219/http://www.ki.com/about_press_release.asp?id=49.
Office Insight, [Publication Date Unlisted], Dated Mar. 23, 2009.
KI Genius Full-Height Moveable Walls, [Publication Date Unlisted], Copyright Date 2003 by KI, Document Code KI-00506/HC/PP/803.
U.S. Specifier Guide and Price Book, [Publication Date Unlisted], Dated Jan. 1998.
Achieving the Atkins Aesthetic: KI's new ThinLine option for its award-winning Genius Architectural Wall flaunts a slimmer figure, [Publication Date Unlisted], Dated Jun. 14, 2004.
SMED International—Lifespace—Technical Information, [Publication Date Unlisted], Dated Jan. 1, 1996.
Teknionaltos—Price and Product Guide Update, [Publication Date Unlisted], Dated Feb. 2002.
Office Action for U.S. Appl. No. 14/681,874 dated Jul. 23, 2015.
Canadian Office Action for Application No. 2,800,414 dated Jul. 15, 2015.
Final Office Action for U.S. Appl. No. 14/657,837 dated Nov. 2, 2015.
Patent Owner's Preliminary Response for Case No. IPR2015-01690 Dated Nov. 13, 2015.
Patent Owner's Preliminary Response for Case No. IPR2015-01691 dated Nov. 18, 2015.
Decision Denying Institution (IPR2015-01690), *Allsteel* v. *DIRTT Environmental Solution* dated Jan. 27, 2016.
Decision Granting Institution (IPR2015-01691), *Allsteel* v. *DIRTT Environmental Solutions* dated Feb. 2, 2016.
Notice of Allowance for U.S. Appl. No. 29/492,776 dated Jan. 21, 2016.
Notice of Allowance for U.S. Appl. No. 29/493,280 dated Jan. 21, 2016.
Notice of Allowance for U.S. Appl. No. 14/657,837 dated Apr. 12, 2016.
Final Office Action for U.S. Appl. No. 14/681,874 dated Apr. 15, 2016.

* cited by examiner

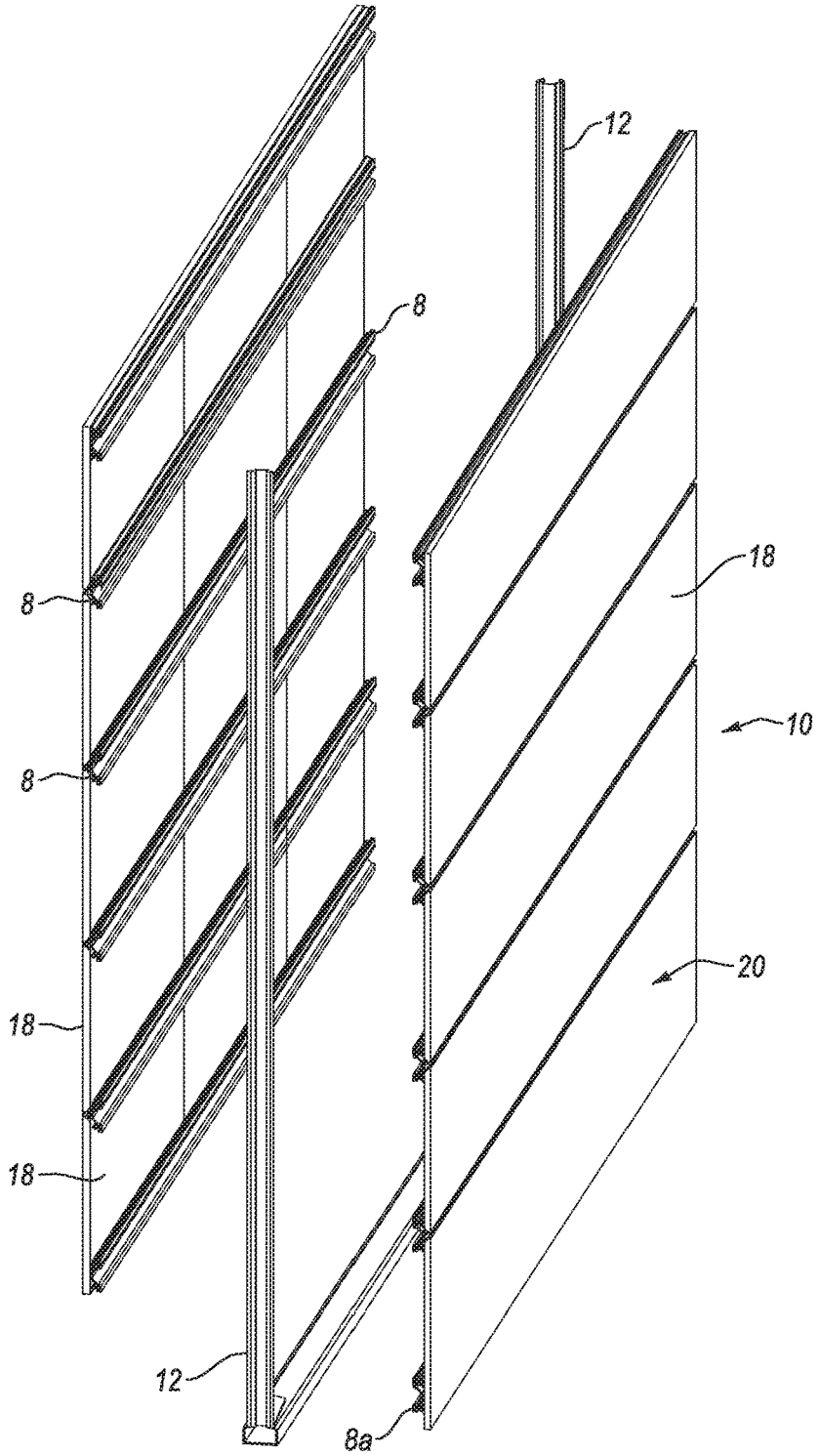
AMENDED
Figure 1

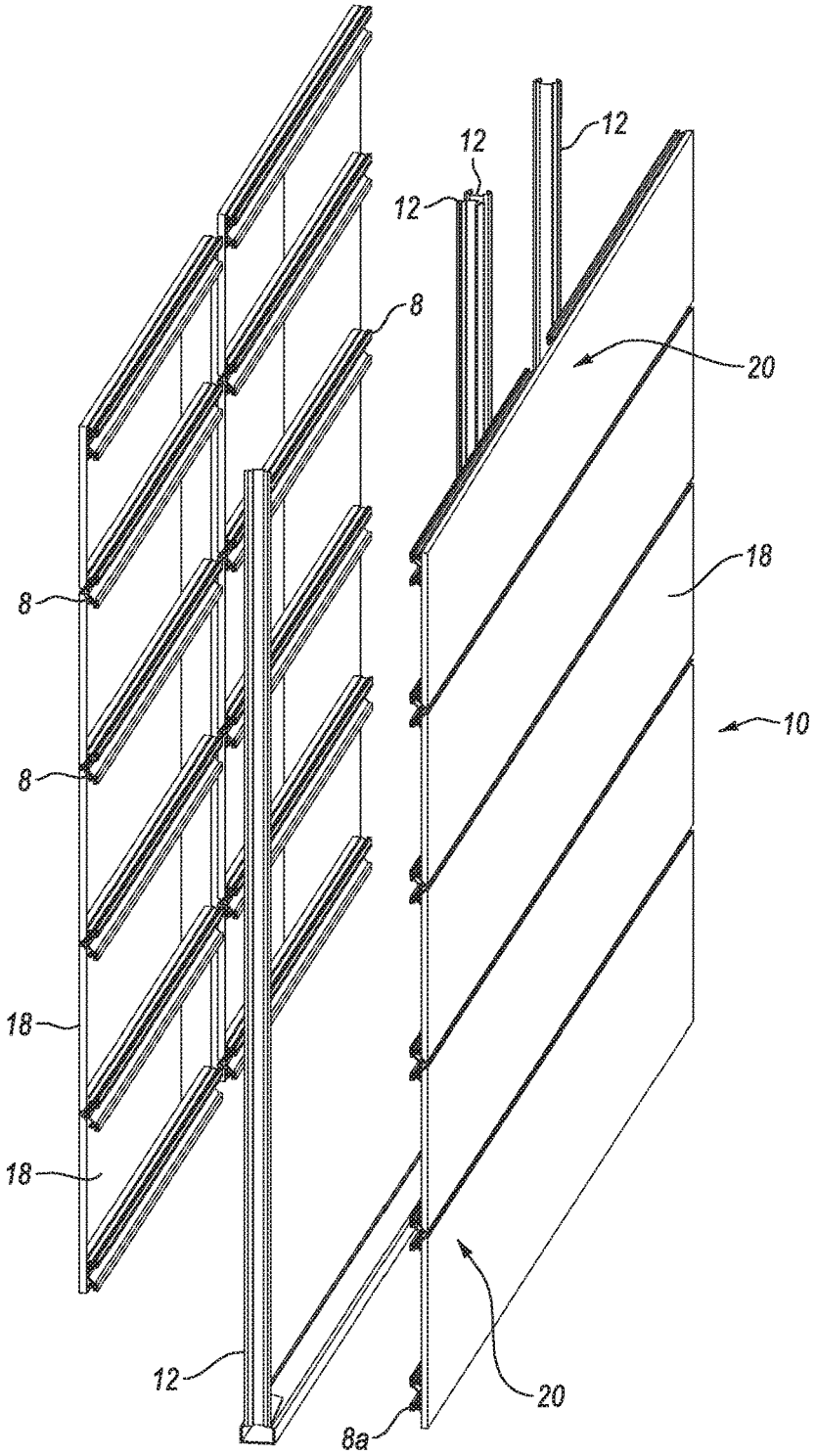
NEW
Figure 1A

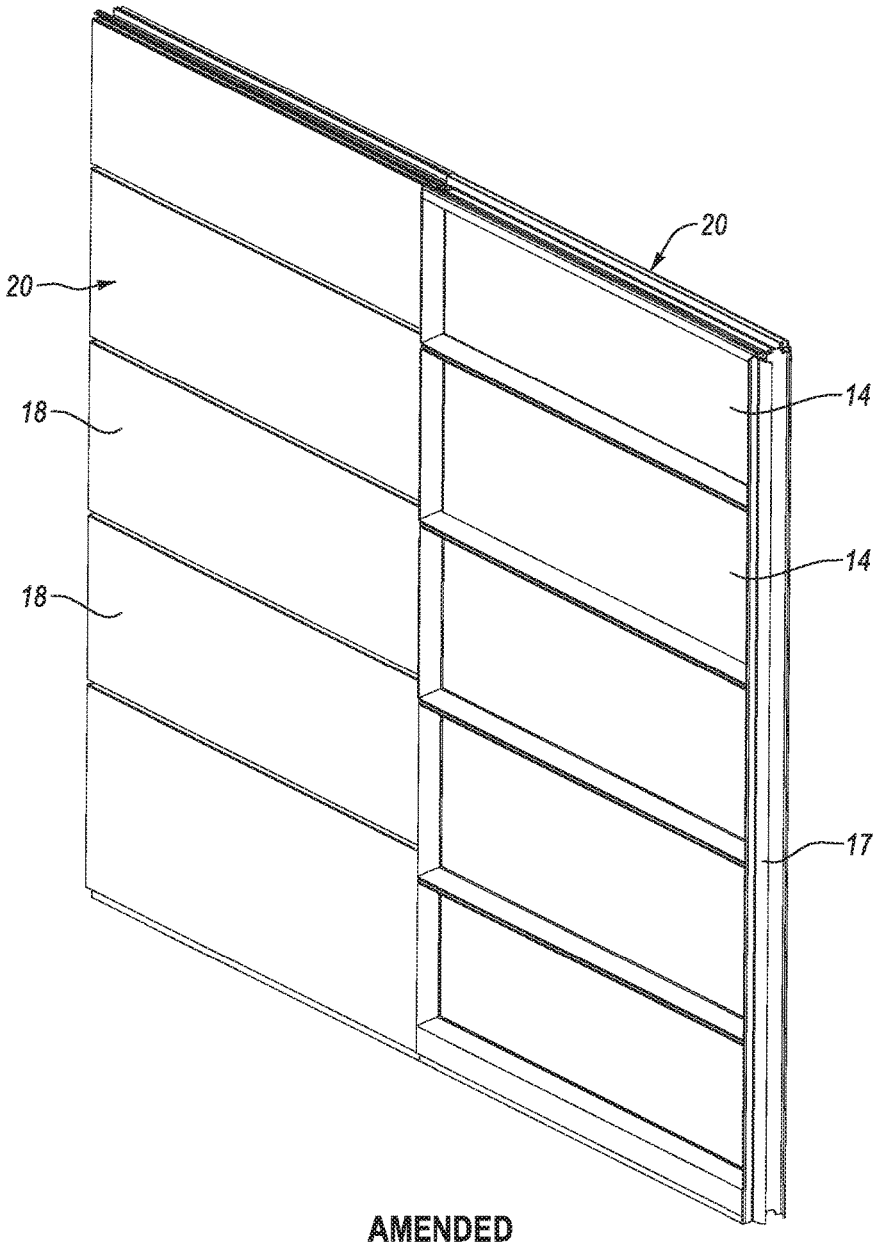
AMENDED
Figure 2

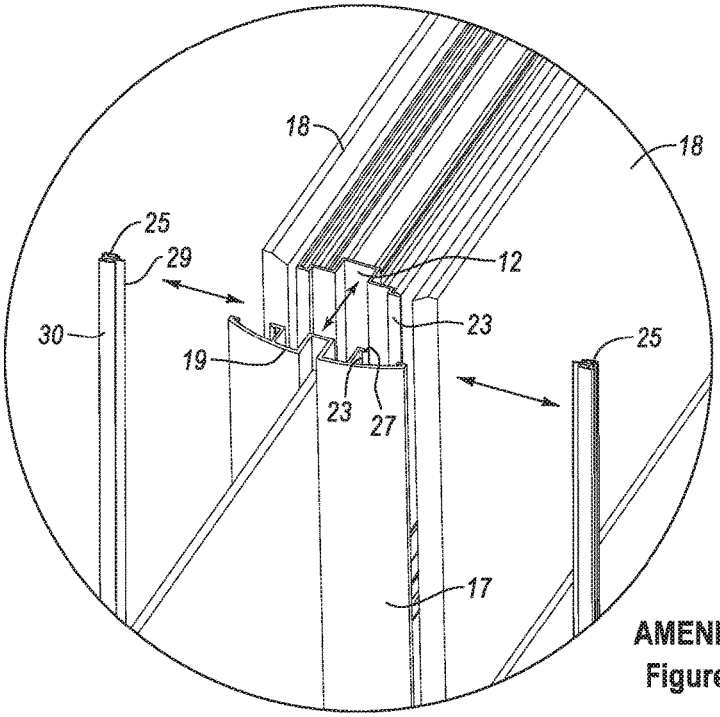
AMENDED
Figure 4

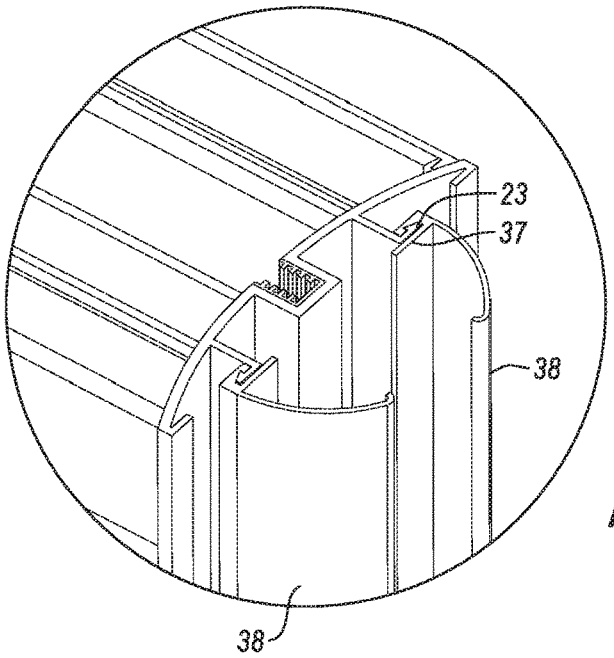
AMENDED
Figure 6

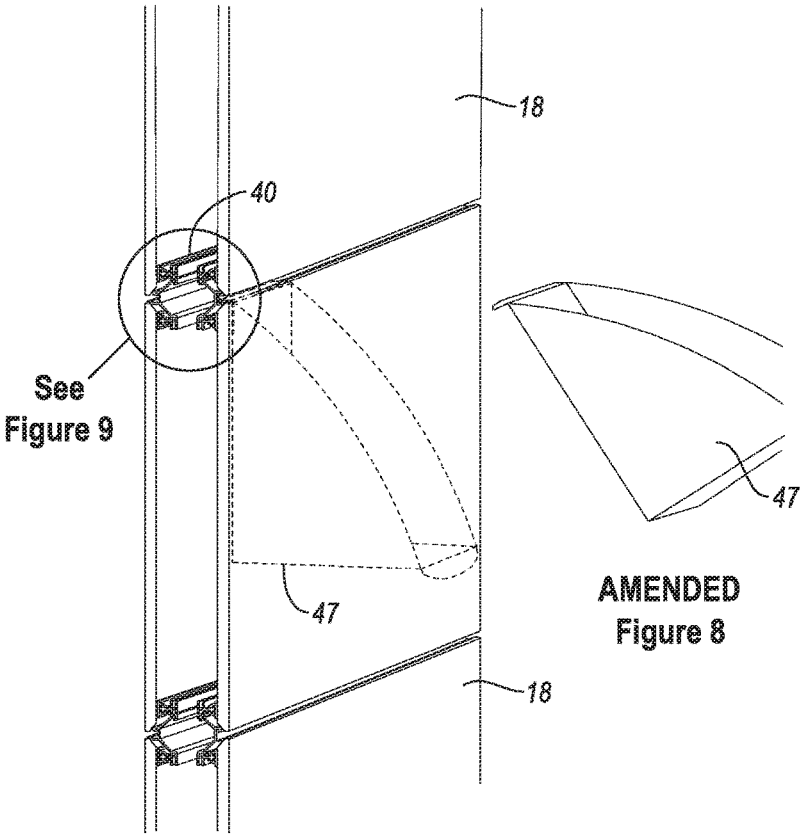
AMENDED
Figure 8
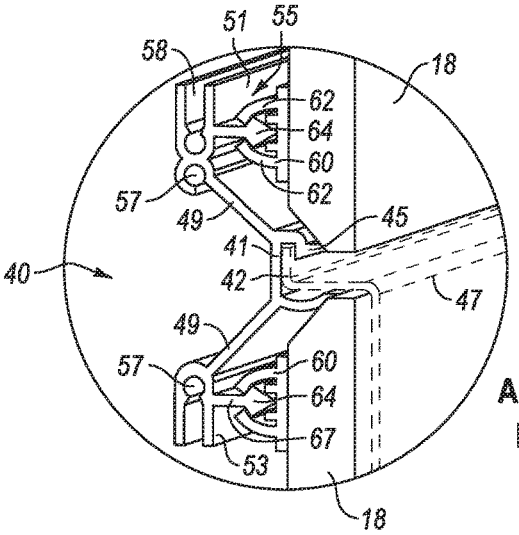
AMENDED
Figure 9

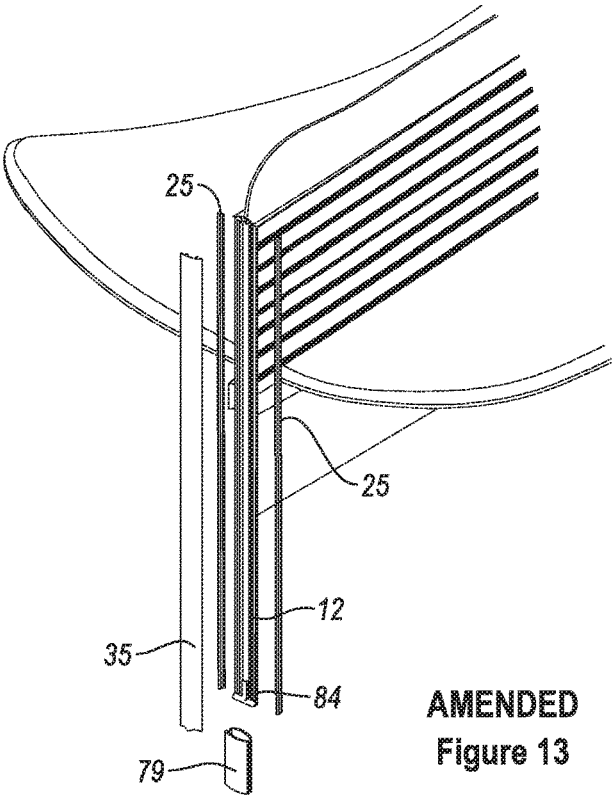
AMENDED
Figure 13

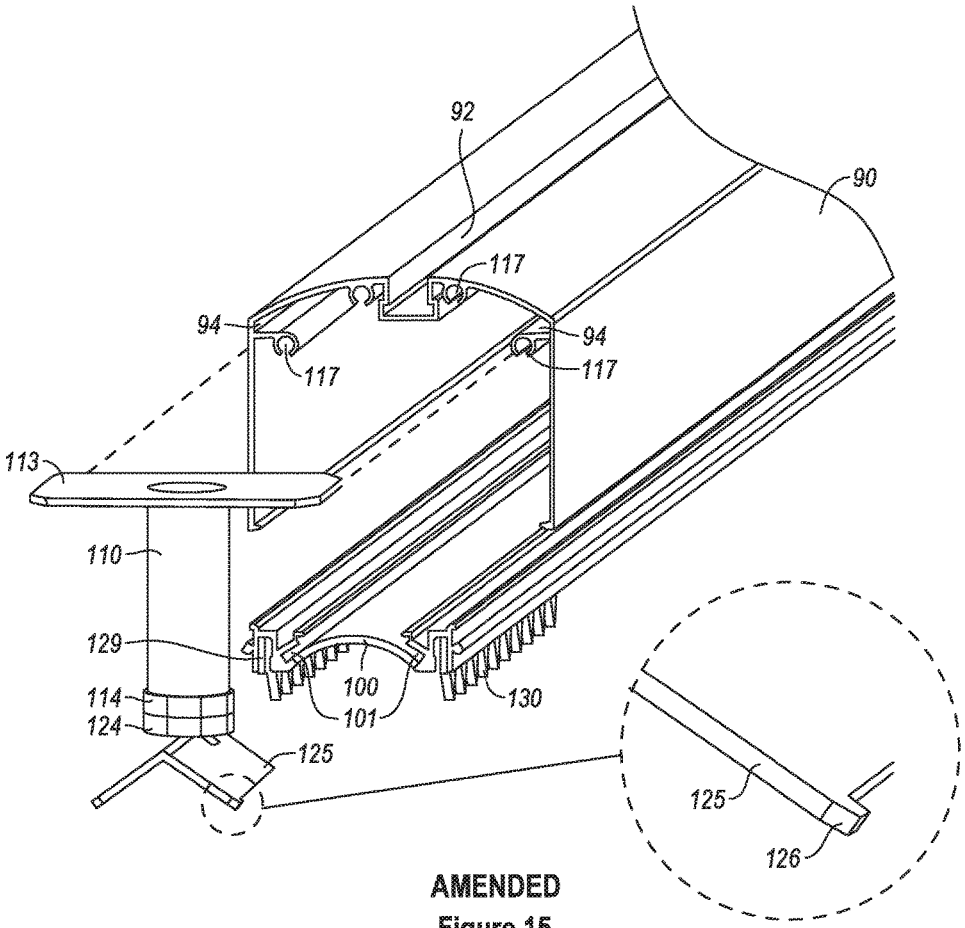
AMENDED
Figure 15

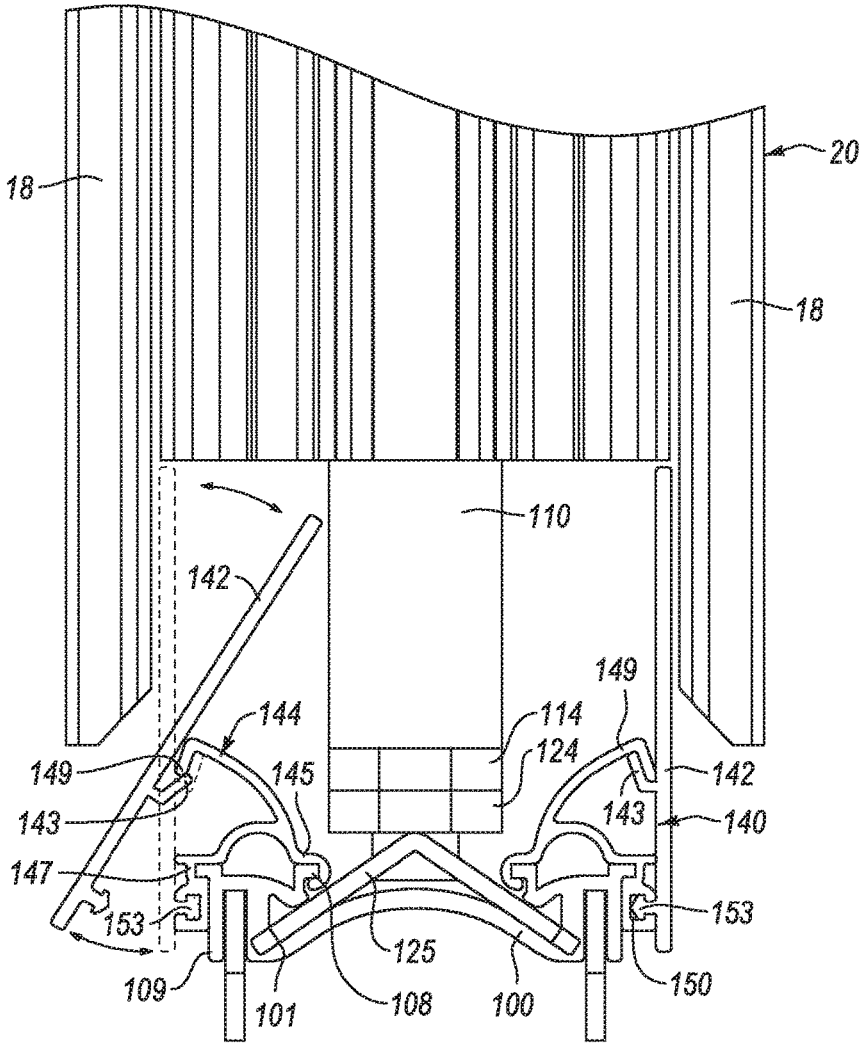
AMENDED
Figure 16

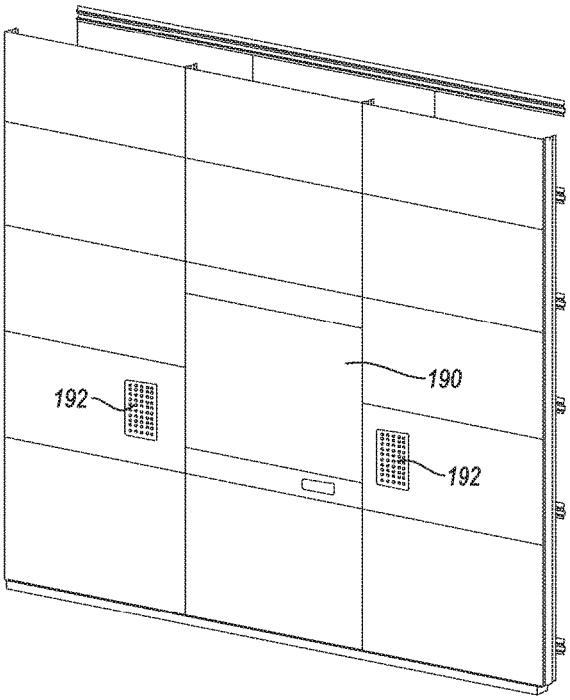
AMENDED
Figure 17
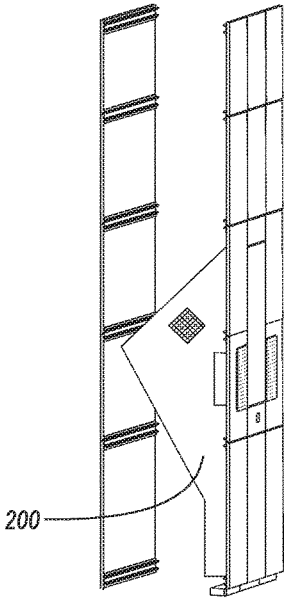
AMENDED
Figure 18

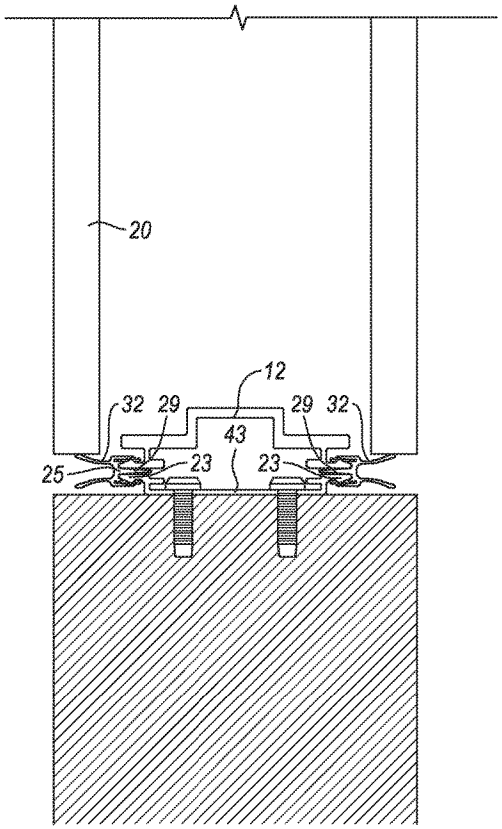
AMENDED
Figure 25

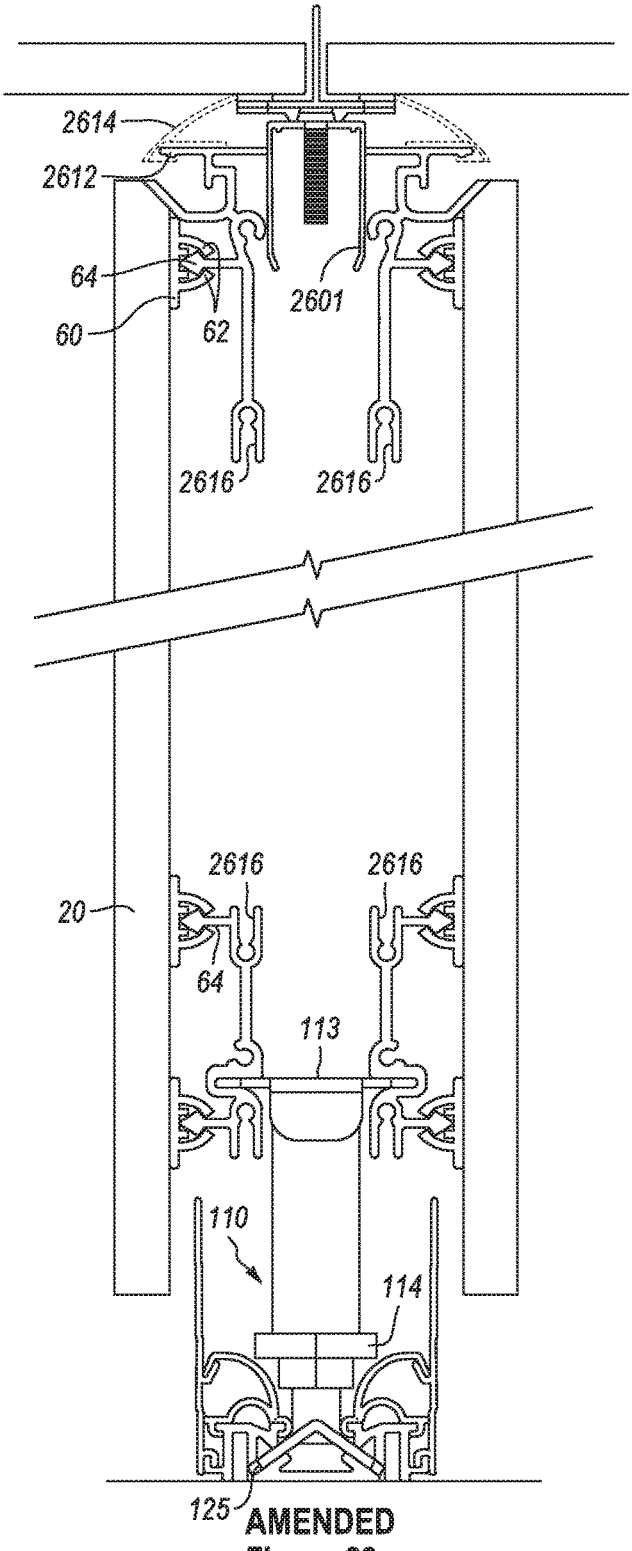
AMENDED
Figure 26

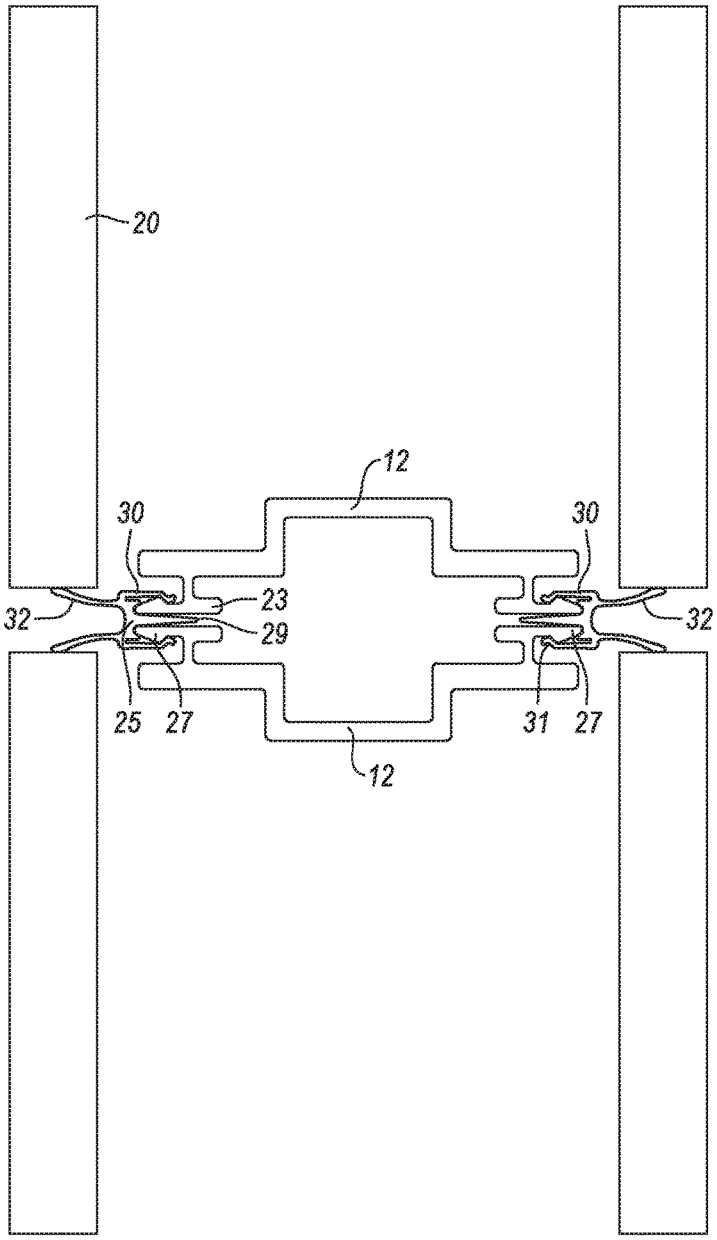
AMENDED
Figure 28

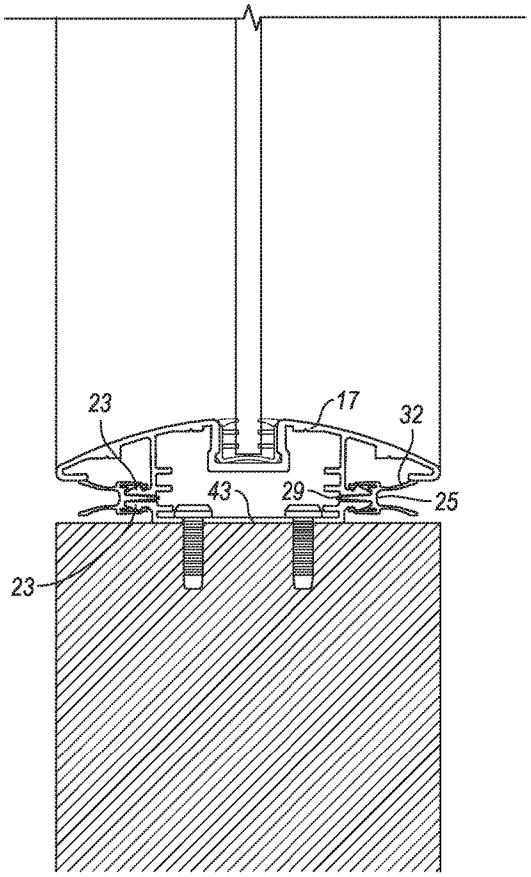
AMENDED
Figure 31

INTEGRATED RECONFIGURABLE WALL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[The present invention] *Notice: More than one reissue application has been filed for the reissue of U.S. Pat. No. 8,024,901. The reissue applications are the present application, Reissue Divisional application Ser. No. 14/681,874, Reissue application Ser. No. 14/305,819, and Reissue application Ser. No. 14/032,931. This application is a continuation reissue of application Ser. No. 14/032,931, entitled "INTEGRATED RECONFIGURABLE WALL SYSTEM", filed Sep. 20, 2013, which is an application for reissue of U.S. Pat. No. 8,024,901, which* claims the benefit of the filing date of U.S. Provisional Patent Application Ser. No. 60/601,985, entitled "INTEGRATED RECONFIGURABLE WALL SYSTEM", filed Aug. 17, 2004. *The present invention is also a reissue of U.S. Pat. No. 8,024,901.*

FIELD OF THE INVENTION

The present invention relates to a wall moveable system, and more particularly to a reconfigurable moveable wall system comprising reconfigurable components and design elements.

BACKGROUND OF THE INVENTION

Wall systems, or dividers as they are sometimes called, are used most commonly in an office environment to separate work areas and to give people privacy where permanent walls are lacking. It is beneficial to have a wall system that is easily movable and easily reconfigured given the ever changing needs and requirements in these environments. Another important aspect in an office is to maximize available space. Aesthetics are also important, including the ability to provide the aesthetic element independently of underlying structural componentry.

Previous wall systems have lacked some or all of these attributes. Some are difficult to reconfigure or to move without significant amounts of labour and dislocation. Most systems lack the flexibility to quickly change the height of a wall, or to use or substitute different types of panels, or replace a module in the middle of a wall without taking apart the entire wall. There also is a need to be able to use the wall system against an existing wall as a curtain wall for an integrated look and to provide the design flexibility needed in those spaces bordered by permanent walls.

SUMMARY OF THE INVENTION

In a preferred embodiment, the present wall system comprises at least one module, where each module includes a frame and a plurality of tiles mounted to the frame by means of a tile clip system. Clips are attached to the rear surface of each tile and the tile is then pressed into place, aligning the clips with a capture detail on the horizontal frame stringers.

Tiles can span adjacent frames where required. Horizontal frame stringers may include a cantilever channel detail where desired to allow objects to be hung along the width. A single frame comprised of two verticals frame members and a plurality of horizontals stringers mounted to an existing wall by connecting the horizontal members to brackets attached to the existing wall allows tiles to be mounted as a curtain wall on the existing wall. Two frames may be supported back to back within a framework for modules used to divide adjacent work spaces. A spline is attachable to the top of the frame to extend the frame and allow for additional tiles to be added on to increase a module's height if so desired. The spline is also used to connect a different style of frame above the existing frame if so desired. For example, this allows a framed glass module to be attached above a framed wood substrate module. Two adjacent modules are connected using a removable zipper interface. The zipper contains two flexible gasket components. Where tiles will span adjacent frames or meet one another without a gap, the gaskets bend back behind the tiles. Where tiles do not span adjacent frames and a gap is wanted, the gaskets point outward from the frame, between the tiles. At the edge of a module where no other module is to be connected, a starter strip may be placed, wherein the starter strip includes an integral flexible gasket which conforms to the shape of the surrounding environment while providing both light and sound baffling. The cantilever channel between tiles allows for various accessories or mill work to be supported from the outside of the module at convenient locations and to be adjusted as needed.

The present wall system also includes a glass wall module, where each module includes a frame and a plurality of glass tiles mounted within the frame. The glass may be center mounted, front mounted or rear mounted. A channel within each end frame extrusion holds a full length gasket extrusion or notch. The glass is retained within the gasket extrusion, around the full perimeter of the glass tile. Extra horizontal or vertical extrusions are attached within the frame to further divide the module into smaller areas.

The present wall system also includes levelers. Levelers include upper, middle and lower sections. The upper section includes a hollow cylinder which is threaded along the interior, and a flat upper plated perpendicular to the leveler. The middle section is a hollow cylinder where the interior and exterior surfaces are threaded in opposite directions, with a fixed nut at one end of the middle section for adjustment. The lower section includes a solid cylinder threaded to correspond with the middle section, a fixed lower nut and an inverted V-shaped lower plate. The leveler is used by having the flat plate in the upper section engage a continuous channel in an the lowermost extrusion of a module's frame, and the lower plate engaging a continuous universal foot, located beneath each module. The V-shape of the lower plate distributes the weight of the wall in the direction of the connection channels of continuous universal foot. A leveler can be placed at any location along the width of the module, allowing for a plurality of levelers to be used if needed. Along the base of the universal foot is a plurality of grippers, which can be adapted for either carpet or hard flooring surfaces. The attachment of the leveler to the module is secure and without extra fastener requirement of any sort. Sliding the leveler plates into the extrusion channels, followed by the attachment of subsequent vertical members, secures the levelers in place.

A base trim is provided which, in one embodiment, can be removably secured to the universal foot to provide access to the levelers when needed but which otherwise provides a finished look to the modules. The base trim can be modular, or span multiple frames.

Wall modules can be adapted to include integrated rear projection video systems or digital whiteboards. Front projection screens or whiteboards can be mounted within the frame confines, or spanning adjacent frames.

The present wall system provides for true curved walls. Curved wall frames are comprised of straight vertical extrusions and stretch formed horizontal extrusions which are curved to the required radius. Glass or other substrate tiles are curved to match the radius of the frame and mounted in the same manner as planar wall modules.

The present wall system can incorporate universal slat wall constructions which would accept all standard slat wall accessories. The slat wall component is a horizontal structural extrusion, interlocking above and below the cantilever channel horizontal member or other slat wall extrusions.

The present wall system can also support desktops and work surfaces using support brackets in the cantilever channel.

The present wall system also integrates completely with a related furniture panel system. A furniture panel system is comprised of a frame and plurality of tiles attached to the frame. The furniture panel system is designed to serve as cubicle type dividers or desk type units, rather than full height walls. The integration to the furniture panel system is seamless, as the zipper connection detail, tile clip capture detail and cantilever detail are identical to the wall system connection details. All components used in or on the wall system can also be used in or on the furniture panel system.

According to the present invention then, there is provided a movable reconfigurable wall system comprising: at least one module having a front and rear surface, said at least one module having: vertical end frames disposed at least at its side edges, each said vertical end frame having a vertically extending flange directed toward said front surface and a vertically extending flange directed toward said rear surface; a plurality of horizontal stringers affixed between said pair of vertical end frames; and an aesthetic surface affixed to said stringers; and a removable connecting strip, said connecting strip adapted to affix about one of said two flanges on one of said vertical end frames and join said one of said two flanges to a corresponding flange on one of a second module, a wall bracket, a finishing trim or a connection post.

BRIEF DESCRIPTION OF THE DRAWINGS

Preferred embodiments of the applicant's integrated reconfigurable wall system will now be described in greater detail and will be better understood when read in conjunction with the following drawings in which:

FIG. 1 is an exploded perspective view of a module representative of the present tile cladded wall system;

FIG. 2 is a perspective view of a wall system including two adjacent modules, one tile cladded and one glass wall;

FIG. 4 is an exploded view of FIG. 3;

FIG. 6 is a perspective view of a frame member including a wall starter trim where a module meets an existing wall;

FIG. 8 is a perspective view of a portion of a wall module showing the orientation of horizontal members with integrated cantilever channel;

FIG. 9 is an enlarged view of a portion of FIG. 8 showing cantilever bracket details and tile clip connection details;

FIG. 13 is a perspective, partially exploded view showing the assembly of a leg used to support the panel furniture system, utilizing the same connection zipper as the wall components of FIG. 12;

FIG. 15 is a perspective view of one embodiment of a leveller mounting system as it slides into the channel of a lower glass wall extrusion and universal foot extrusion;

FIG. 16 is a side elevational view of the base trim connection to the leveller assembly;

FIG. 17 is a perspective, schematic view of the present wall system including integrated media panels and storage areas;

FIG. 18 is a perspective, schematic view of the present wall system incorporating an integrated media center;

FIG. 25 is a plan view of a connector for connecting to existing walls according to the present wall system;

FIG. 26 is a side elevational view of a floor leveller and ceiling connector for a solid (tile clad) wall;

FIG. 28 is a plan view of two wall panels having a gap between adjoining panels;

FIG. 31 is a plan view of an end vertical and gasket for abutting existing walls with the present glass wall system.

DETAILED DESCRIPTION OF THE PREFERRED EMBODIMENTS

Figure 3:
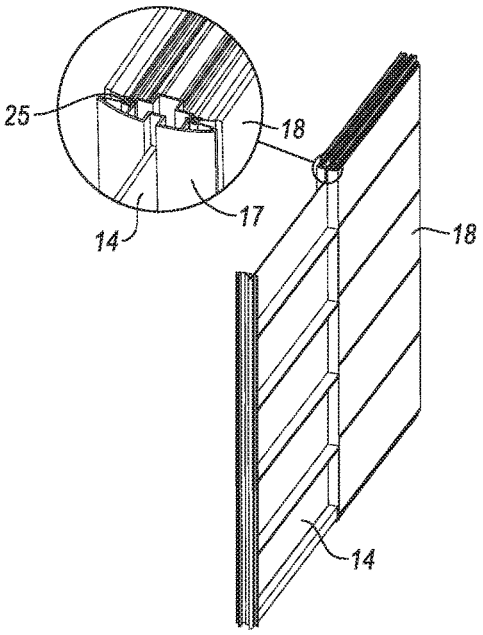
FIG. 3 is an enlarged view of a portion of the wall system of FIG. 3 showing the connection between adjacent modules.

With reference to FIG. 1, the present invention is directed towards a wall system 10 made up of one or more modules 20. Each module comprises a pair of vertical end frames 12 that will be spaced apart by the desired width of each module. Modules 20 may be clad with tiles 18 and can be one or two sided with a finished wall surface on both sides or a finished wall surface on one side only. Tiles 18 can be made of wood, plastic, metal fabric glass or other material, and end frames 12 may be interconnected by a plurality of horizontal stringers 8 that will be described in greater detail below.

With reference to FIG. 2, the next adjacent module 20 can be identical to its neighbour, or, as shown in this figure, may consist of two vertical end frames 17 and one or more dividers 14 which can be, for example, glass or plastic if transparency is desired. End frames 17 used for such dividers are shaped as shown most clearly in FIG. 4 and include a notch 19 that receives and holds the divider's vertical edge.

Stringers 8 are horizontally spaced apart at intervals along the height of the module for strength and rigidity. To support objects, cantilever channel stringers 40, including a cantilever channel portion 41, are used, as shown in FIGS. 8 and 9. Stringers 8 that do not include channel portion 41 can be used anywhere structure is required but the channel portion is not required for supporting objects. For example, the lowest stringer 8a may not include cantilever channel portion 41. The stringers are connected to end frames 12 by fasteners, usually threaded screws, in a manner to be described below.

If the module will be visible from both sides, finishing tiles 18 can be connected to the stringers on both sides of module 20. It is not necessary that the tiles on one side of the wall be at all like the tiles on the other. They can be different materials or even aligned differently as shown in FIG. 1, in which the tiles on one side of the module are horizontally mounted and the tiles on the other side of the wall are vertically mounted for a different look. The tiles can also span adjacent modules, if required. *For example, FIG. 1A depicts finishing tiles 18 spanning adjacent modules 20.* If only one side of the module will be visible, which can be the case for example if the module is used as a curtain wall to cover an existing wall, its necessary to apply tiles 18 to only one side of the module as needed.

The depth or thickness of the module can be selected by varying the width of frame 12. For example, as will be described below, the modules can house a rear projection or digital video system and the greater depth is needed to enclose the componentry.

Figure 29:
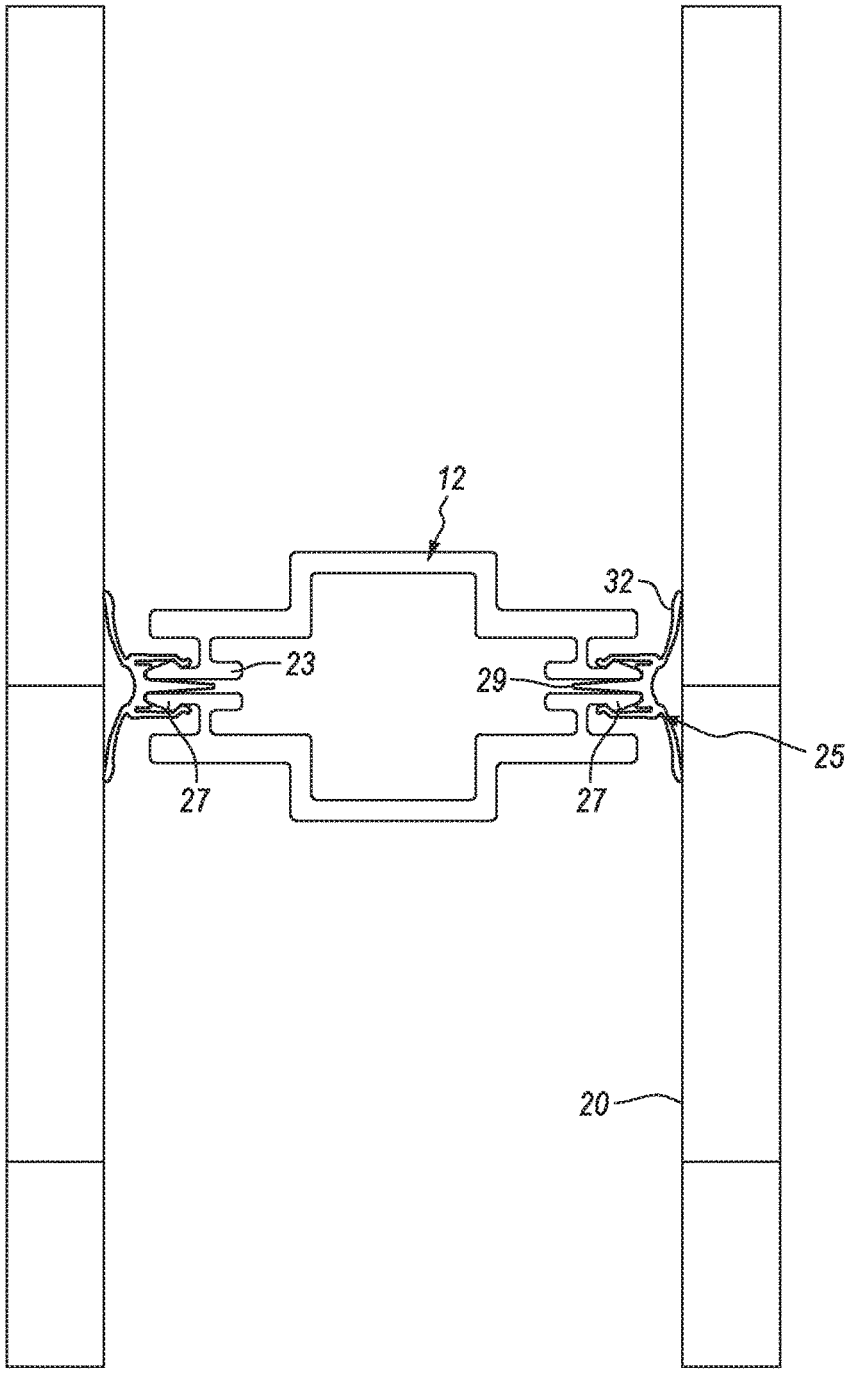
FIG. 29 is a plan view of two wall panels directly abutting each other and being sealed with a zipper.

With reference to FIGS. 3, 4, 5 28 and 29, each end frame 12 and 17 includes a pair of rearwardly extending L-shaped flanges 23 that align vertically with correspondingly positioned and shaped flanges 23 on opposite end frame 12 or 17 so that frames 12 and 17 can be connected together by connecting strips ("zippers") 25. If the adjacent module 20 itself comprises an end frame 12 as shown in FIGS. 28 and 29, flanges 23 will abut and will be connected together in the same manner using zippers 25. As shown most clearly in FIG. 28, each of flanges 23 is formed with a bead 27. Each zipper 25 is generally T-shaped in cross-sectional shape and includes a central spine 29 that fits between flanges 23 and a pair of arms 30 on opposite sides of the spine. Each arm includes a bead 31 that snap fits with beads 27 on flanges 23 for a secure but releasable connection. When two adjacent modules are connected together in this way, there is enough of a gap between them that the zippers can be accessed for removal, allowing an individual module to be removed should the need arise.

As illustrated in FIGS. 28 and 29, each zipper can also include a pair of flexible extended fins 32 extending rearwardly from the spine 29. Depending on the application, a user may wish adjacent modules to be abutted together completely or to have a gap between them. In FIG. 28, a gap exists between the modules, and this gap is sealed using extending fins 32. As will be appreciated by those skilled in the art, the width of the gap is variable since extensions 32 are flexible and can accommodate various widths.

If no gap is desired, or if tiles span adjacent modules, FIG. 29 illustrates an embodiment having adjacent panels. In this case extensions 32 are behind each panel, and the force of extensions 32 against the rearward side of the module creates an acoustic seal for the wall.

Figure 30:
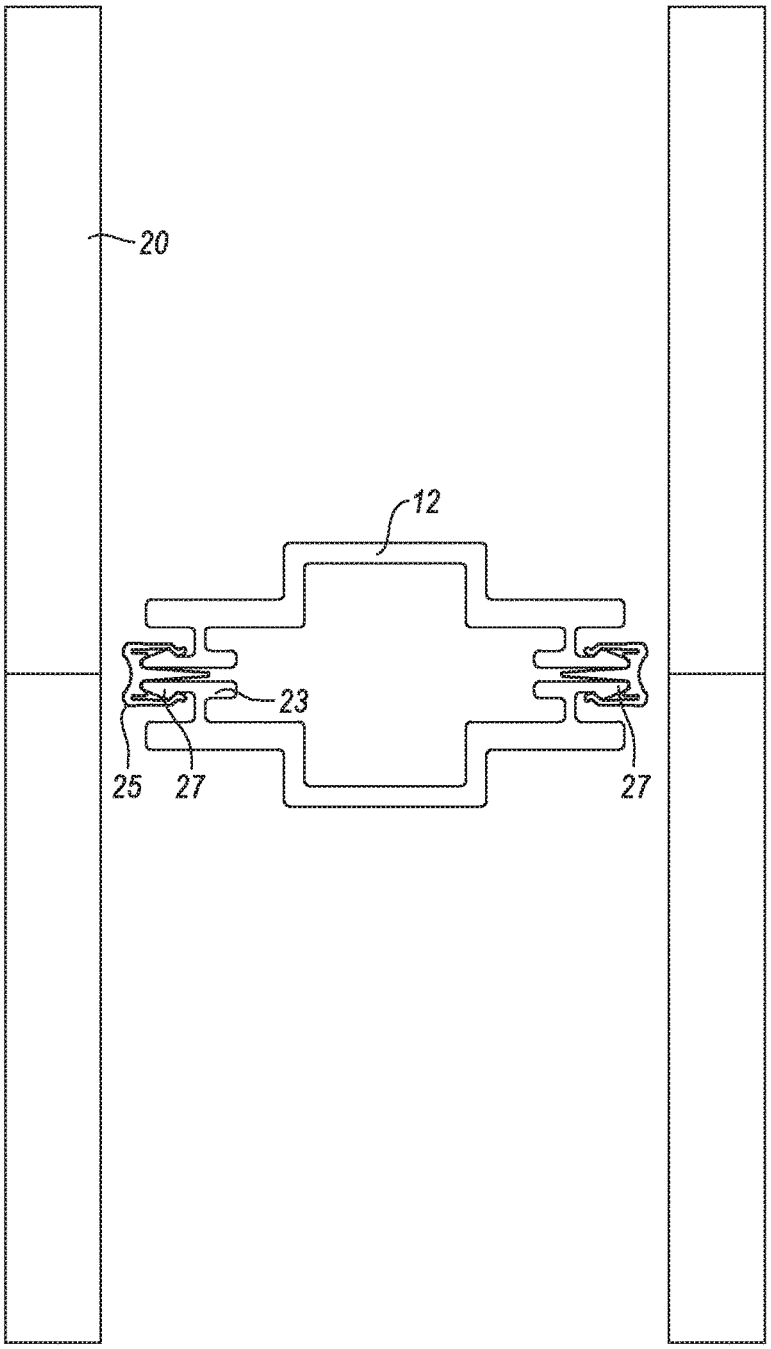
FIG. 30 is a plan view of two wall panels directly abutting each other and having a zipper with no fins.

In an alternative embodiment illustrated in FIG. 30, it is also possible to have a zipper 25 without extensions 32. This may be desirable when modules 20 abut and an acoustical seal is not required.

*As such, in various embodiments, the zipper 25 may be positioned in a recessed location within the wall system 10. The recessed zipper 25 may allow for a single tile 18 to span multiple modules 20 without interference from the zipper 25. Additionally, a recessed zipper 25 may allow for the free movement of accessories 47 between adjacent wall modules 20 within a cantilever channel 41.*

Figure 5:
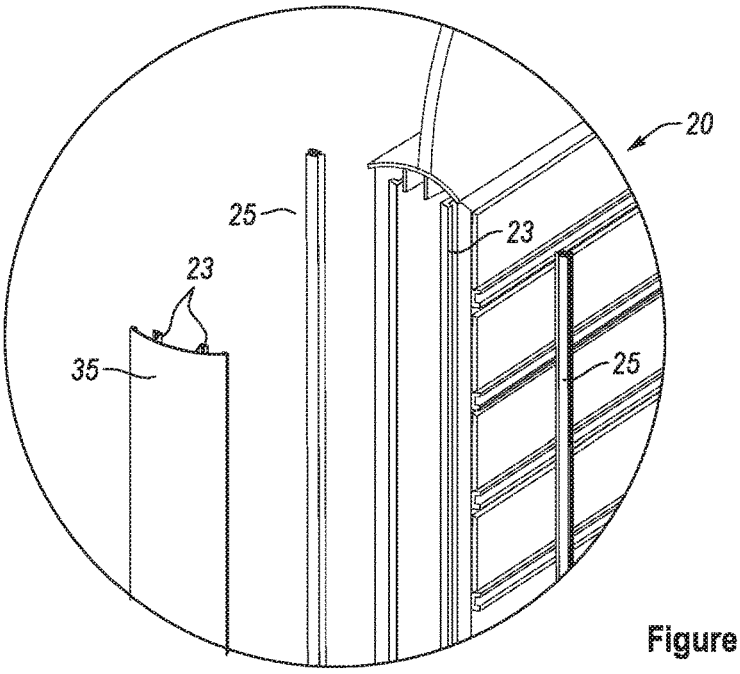
FIG. 5 is a perspective view of a frame member including a finishing trim.

FIG. 5 shows an end piece 35 similar to end frame 17 but lacking notch 19. This end piece is therefore used to finish the vertical edge of module 20 using zippers 25 if no additional module is to be connected to it.

Figure 24:
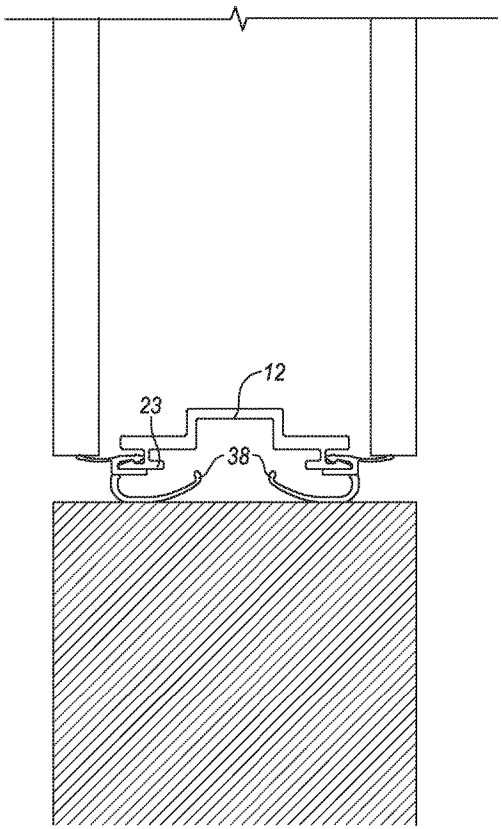
FIG. 24 is a plan view of an end vertical and gasket for abutting existing walls with the present wall system.
Figure 32:
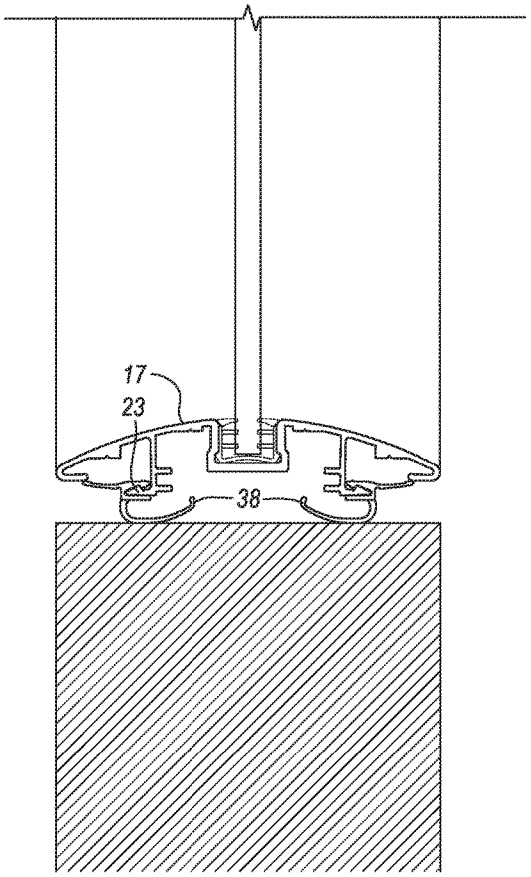
FIG. 32 is a plan view of a connector for connecting to existing walls according to the present glass wall system.

If either of frames 12 or 17 is to start, or end, at an existing wall, flexible starter strips 37 can snap-fit onto flanges 23 as shown most clearly in FIG. 6. Starter strips 37 include curved flexible gaskets 38 which will conform to the shape of the existing wall and will provide sound and light barriers. This can also be seen in FIGS. 24 and 32.

Alternatively, as illustrated in FIGS. 25 and 31, a wall start 43 can be mounted to an existing wall to provide a start to a module. Wall start 43 is preferably an aluminum extrusion mounted vertically to an existing wall using known mounting techniques. The mounting technique of screws shown in FIG. 25 is not meant to be limiting.

Wall start 43 includes a flanges 23 and is connected to an end frame 12 or 17 using a zipper 25. As indicated above, extensions 32 can provide a seal against the wall and panel.

Figure 7:
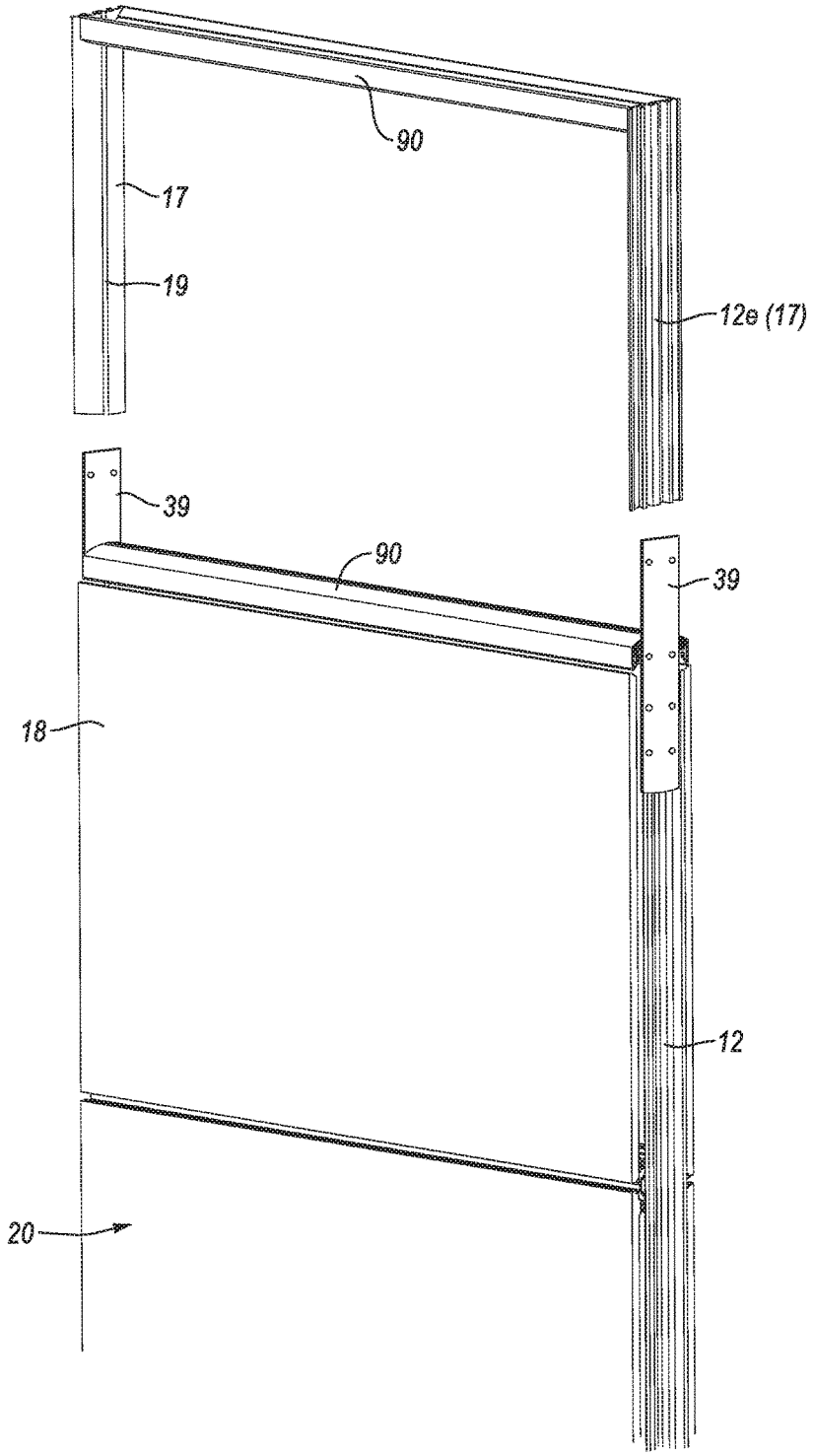
FIG. 7 is a perspective view of a height extension to an existing module.

To increase the height of an existing module 20, or to combine a glass module above or below a tile-clad module, a spline 39 can be used to connect end frame 12 (or 17) to an extension frame 12e as shown most clearly in FIG. 7. Actually, as shown in this figure, extension frame 12e is a length of frame 17, which allows the lower portion of the wall to be hung with standard tiles and the upper extended portion of the wall to be finished in a glass or plastic divider 14 for a combination of finished looks. The upper and lower extrusions 90, which complete the framing of divider 14, will be described below in connection with a levelling system in which the same extrusion is used.

It is desirable that work surfaces, mill work and wall accessories such as trays or document holders be connectable to modules 20. This can be easily achieved in the present system by using cantilever channel stringers 40 with channel brackets horizontally disposed in the channel between adjacent tiles 18 as shown most clearly in FIGS. 8 and 9.

Each channel stringer 40 includes a central horizontally extending channel portion 41 with a generally L-shaped slot 42 formed along its length adapted to receive and engage a substantially L-shaped hook 45 formed on a wall accessory 47 such as the document holder shown in FIG. 8. A pair of diagonally extending webs 49 connects channel portion 41 to upper and lower portions 51 and 53 respectively. Each portion includes a tile support 55 that is the connection point for the tiles 18 that are mounted above and below channel portion 41. More specifically, the upper and lower edges of tiles 18 are provided with a *tile clip, e.g.,* connector strip 60, *which is* attached by means of screws, adhesive or any other suitable fastening *to the rear surface of tile 18, as illustrated*. Each *connector* strip *60* includes a pair of opposed flexible arms 62 to snap-fit with a *protrusion* (*e.g.,* generally arrow shaped bead 64 formed along the edge of flanges 67) that are formed on and [extend] *extends* the length of each upper and lower portion 51 and 53. This allows individual tiles 18 to be removed or replaced without having to disassemble the entire wall. The flanges 23 formed on vertical end frames 12 and 17 that are connected together by zippers 25 are located sufficiently inwardly that the zippers will not interfere with the continuity of slot 42 from one module to the next so that wall accessories, mill work or work surfaces can be connected or moved between modules without interference. The upper and lower edges of tiles 18 that abut channel portion 41 of each channel bracket are camphored for clearance as seen most clearly in FIG. 9.

The upper and lower portions 51 and 53 of the channel stringer 40 are advantageously formed with longitudinally extended circular recesses 57 and inner channels 58. Recesses 57 are adapted to receive screws used to connect end frames 12 or 17 to channel stringers 40. Channels 58 can be used to support mounting hardware for audio-video equipment mounted within the modules, cable management clips or any other hardware to be housed or contained in the module's interior. Channels 58 are also used to connect a single-sided tile clad module to brackets attached to existing wall surfaces.

Figure 10:
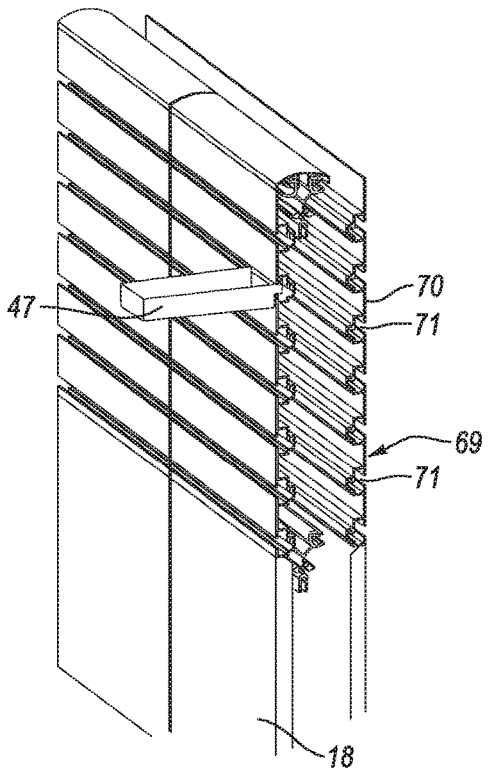
FIG. 10 is a perspective view of a wall panel incorporating slat wall construction.
Figure 11:
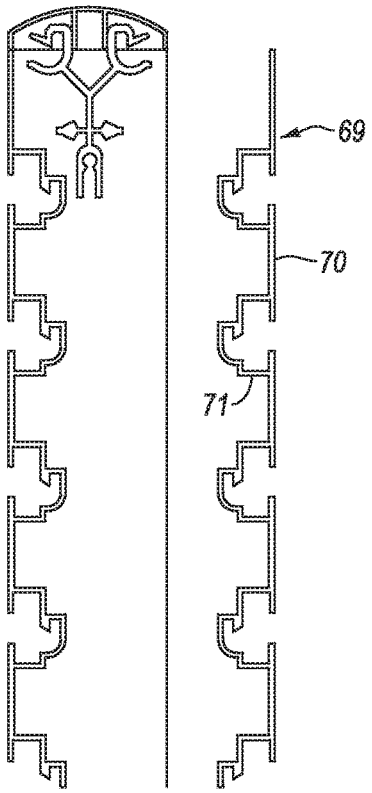
FIG. 11 is a side elevational view of the slat wall construction of FIG. 10.

With reference to FIG. 10, another embodiment of the invention is shown incorporating a section of standard slat wall 69 including slats 70 and slat wall channels 71 for connection to all slat wall accessories 47. Slat wall panels can make up some or all of the panels incorporated into any one module 20 and the modules themselves are configured for use with end frames 12 and zippers 25 so that the modules themselves can be connected together in any desired combination. Slat wall modules can be one (FIG. 11) or two sided (FIG. 10) for use as either dividing or curtain walls.

Figure 12:
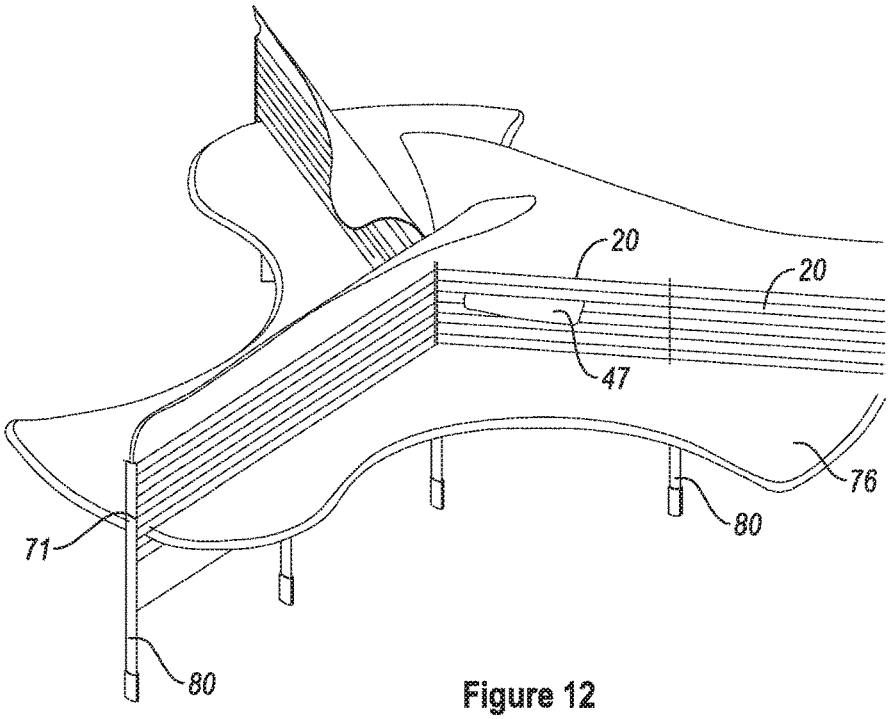
FIG. 12 is a perspective view of the related panel furniture system utilizing the same connectors and slat wall extrusion to support a work surface.

As shown in FIG. 12, in the applicant's related panel furniture system, a work surface or desktop 76 can be connected to modules 20. The desktop 76 can hook into either cantilevered channel stringers 40 or into slat wall channels 71 and otherwise the construction of the individual modules 20 is the same as described above for wall system 10. Furniture legs 80 shown in the example of FIG. 12 consist of a vertical frame 12 zipper connected to a finishing end extrusion 35 using zippers 25 as shown in FIG. 13, in the same manner as the wall system 10. The lower end of each furniture leg 80 is finished with a concentric sleeve 79 which conceals a threaded bolt 84 in the lower end of each leg which can be used for levelling.

Figure 23:
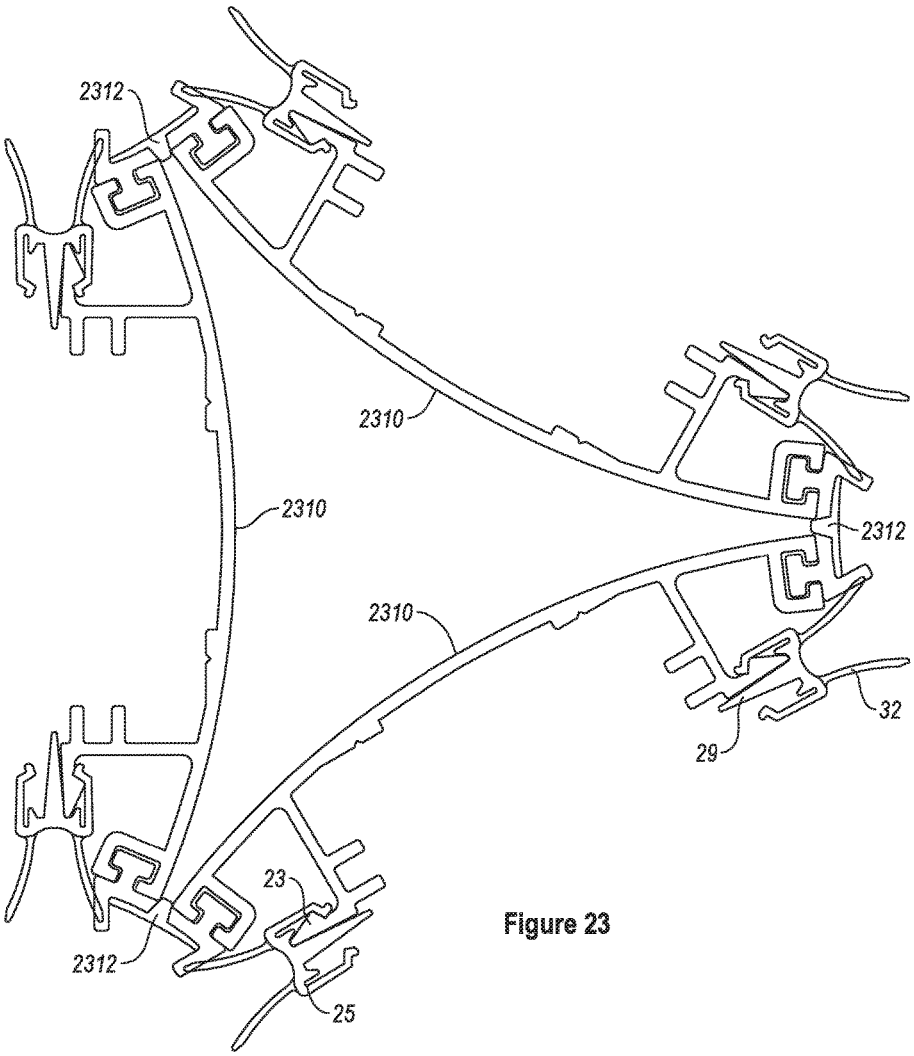
FIG. 23 is a plan view of a 120 degree connector for three merging walls according to the present wall system.

As illustrated in FIG. 23, three vertical extrusions 2310 are connected to each other to create the connection point for the three wall systems, and each wall meets the others at an angle of 120 degrees.

In the case of modules having tiles that extend all the way down to the floor, applicant has developed a leveller mounting system that allows levellers to be placed anywhere along the length of a module and extra levellers to be added where needed. There are two variations of the leveller mounting system shown in FIGS. 15 and 16, one to be used with modules comprising tiles 18, and the other with modules using glass or plastic dividers.

Referring first to FIG. 15, this is the levelling system to be used with modules having glass or plastic dividers extending down to floor level. This system includes a structural extrusion 90, which is generally an inverted U-shaped channel with a notch 92 to engage the lower edge of the glass or plastic divider, and a universal foot 100.

Figure 14:
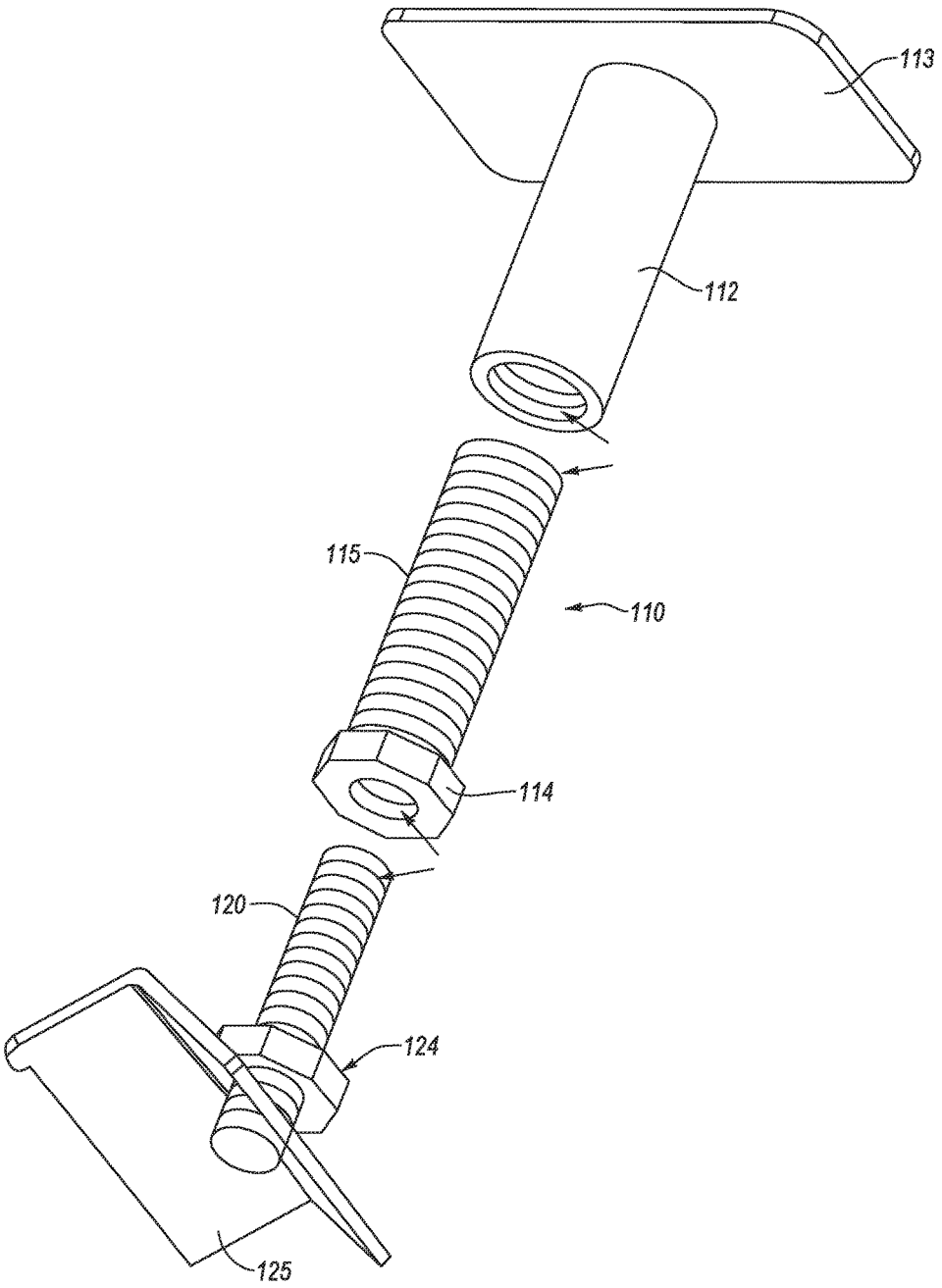
FIG. 14 is a perspective, exploded view of a leveller for use with the present wall system.

Extrusion 90 and universal foot 100 are interconnected by means of dual threaded levellers 110, an example of which is shown in FIG. 14.

Leveller 110 has three distinct sections, an upper section 112, a middle section 115 and a lower section 120. Upper section 112 is cylindrical in shape and is internally left or right hand threaded. A plate 113 is connected to the section's upper end for a permanent connection thereto. Middle section 115 is both internally and externally threaded. The external threads will match the direction of the internal threads on upper section 112 while the internal threads will be in the opposite direction to match the external threading of lower portion 120. A fixed middle nut 114 is disposed at the lower end of middle section 115. Nut 114 can be used to turn middle section 115 relative to the upper and lower sections of the leveller.

As mentioned, the lower section 120 of the leveller is externally threaded and the threading will be in the opposite direction to the internal threading of upper section 112. In this way, each turn of nut 114 doubles the expansion or contraction of the leveller to halve the levelling time. The lower end of section 120 includes its own fixed adjustment nut 124 and an inverted V-shaped lower plate 125.

FIG. 15 shows how leveller 110 is installed. Plate 113 aligns with channels 94 in extrusion 90 to be slidable along the length of the channel to any desired location. The V-shaped lower plate 125 aligns with and slides into grooves 101 in foot 100. Those levellers that fit at the end of a foot are slightly modified to include tabs 126 at the outer corners of plate 125 which prevent the plate from moving inwardly. When vertical end frames 12 or 17 are attached to extrusion 90, plate 113 is prevented from moving outwardly so that the leveller is held in its position at the very end of foot 100. Frames 12 or 17 are connected to extrusion 90 by means of screws that thread into one or more of circular slots 117 in the extrusion.

If modules 20 are situated atop carpet, toothed carpet grippers 130 are inserted into slots 129 in foot 100. If the modules are installed on hard surfaces, nonskid grippers can be inserted instead. The grippers can be placed precisely where needed to bear the modules weight and can be easily moved, replaced or switched over as needed.

FIG. 16 shows a leveller 110 installed on modules 20 and illustrates the installation of base trim 140 used to conceal the levellers 110 when they're not being adjusted. In this view, plate 113 is again slidingly received into channels formed in the module's lowermost extrusion and plate 125 is received into grooves 101 in foot 100. The base trim 140 includes baseboards 142 and snap pieces 144. Snap pieces 144 snap-fit onto foot 100 as shown with grooves 145 and 147 on the snap piece engaging flanges 108 and 109 on the foot. Each snap piece includes a longitudinally extending elevated hook 149 and a similarly longitudinally extending channel 150. Each baseboard includes a hook 143 to engage hook 149 on the snap piece, and a bead 153 that snap fits into channel 150 to retain the baseboards in a vertical position to provide a finished look. Because the baseboards are installed usually after the modules have been assembled together, the boards can span multiple modules for longer runs and fewer seams.

Figure 27:
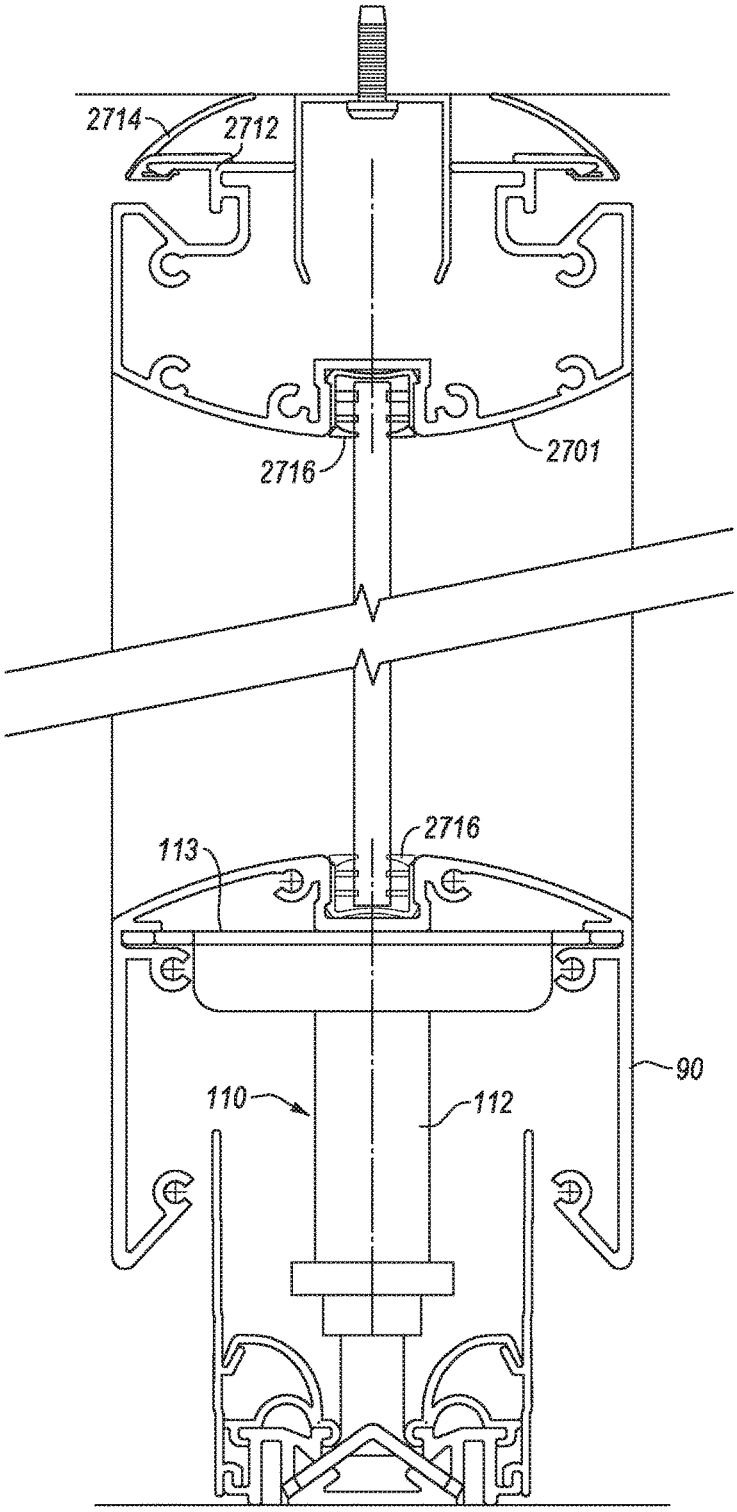
FIG. 27 is a side elevational view of a floor leveller and ceiling connector for a glass wall.

Reference is now made to FIGS. 26 and 27. As illustrated, besides the bottom connection with the leveller (as described with relation to FIGS. 15 and 16 above), a ceiling connection is also preferred.

FIG. 26 shows a ceiling connection for a solid wall, such as those described above having tile cladding. A ceiling track 2601 is affixed to the ceiling above the area for the desired wall. Each module includes two horizontal uppers 2610 abut thereto (on either side of the ceiling track), the horizontal upper including an upper flange 2612. A ceiling trim 2614 is affixed to upper flange 2612. Ceiling trim 2614 is flexible and allows variable spacing of the wall with the ceiling. Specifically, the trim 2614 will flex to allow the wall to move closer or further from the wall as required based on levelling needs.

Horizontal upper 2610 further includes a *protrusion* (*e.g.,* bead 64) as described above to attach a tile (*e.g., via the flexible arms of the illustrated tile clips*) to the horizontal upper. Further, recesses 2616 are used to attach horizontal uppers to frames 12 or 17.

To affix a wall, an installer can first install ceiling track 2601 in the correct location. The wall is then created with levellers 110 in a lowermost position. The levellers 110 are then extended to level the wall and to further cause horizontal uppers 2610 to abut ceiling track 2601 on either side of ceiling track 2601, as illustrated in FIG. 26.

Alternatively, if a divider such as a glass panel is being used, a one piece upper 2701 can be used, as illustrated in FIG. 27. The one piece upper 2701 comprises a flange 2712 to connect a ceiling trim 2714 to. Ceiling trim 2714 is preferably the same as ceiling trim 2614. Upper 2701 further includes a channel 2716 for receiving a divider.

Figure 19:
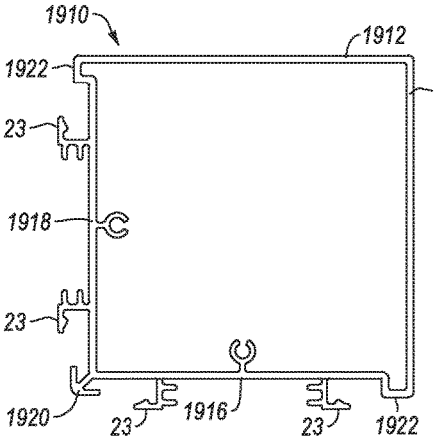
FIG. 19 is a plan view of a two-way rectilinear connector for the present wall system.

The present wall system 10 includes curved walls using curved aluminum stringers and extrusions and curved tiles 18. In conventional systems, curved walls are constructed of faceted panels rather than true, radii arcs. A curved wall is illustrated in FIG. 19.

With reference to FIG. 17, a module 20 is shown in which a couple of tiles 18 have been replaced with an integrated media panel 190. The panel can be a Fresnel lens, a plasma screen, an LCD screen or a digital whiteboard. Rear projection technology can be used to project images onto the Fresnel lens, or the digital whiteboard technology allows sketching, writing, layout or computer screen emulation. In the example shown, adjacent tiles 18 incorporate speakers 192 to provide sound. Tile 18 surrounding the screen area can be used for integrated storage areas.

With reference to FIG. 18, there is shown schematically a module 20 with an integrated media center 200 suspended therein.

Various connectors are also provided to allow the present reconfigurable wall system to form corners. Reference is now made to FIGS. 19, 20, 21 and 22.

FIG. 19 illustrates a two-way rectilinear connector 1910. Connector 1910 includes a finished outer surface on sides 1912 and 1914. Further, flanges 23 are provided on sides 1916 and 1918. Flanges 23 can be used with zipper 25 to connect to end frames 12 or 17. An extension 1920 extends between sides 1916 and 1918 to form a finished corner once modules 20 are connected to these sides. Further, sides 1912 and 1914 include an elongate end 1922 for hiding zipper 25 and creating a finished surface.

Figure 20:
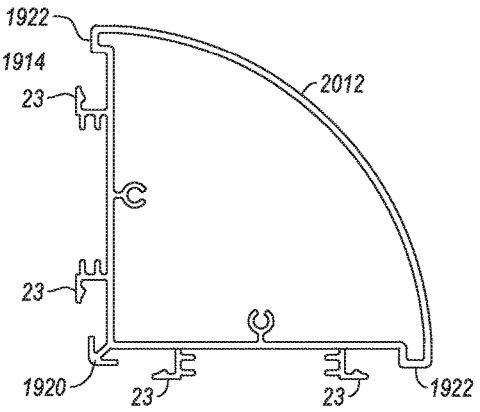
FIG. 20 is a plan view of an alternative (radial) two-way connector for the present wall system.

FIG. 20 is similar to FIG. 19, with the principle difference being the radial finished outer surface 2012 replacing sides 1912 and 1914. Otherwise similar reference numerals are used between FIGS. 19 and 20.

Figure 21:
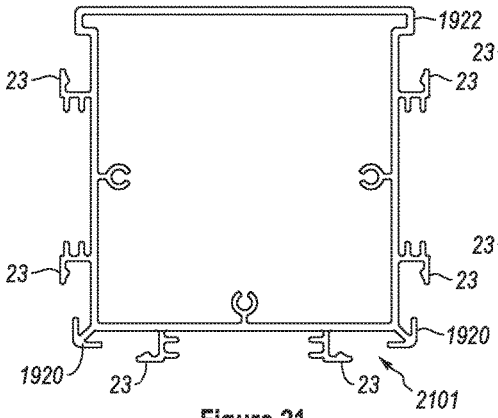
FIG. 21 is a plan view of a three-way connector for the present wall system.

FIG. 21 illustrates a three way connector for a "T" connection. Three modules 20 are connected to connector 2101. Connector 2101 includes a finished outer surface 2112. Flanges 23 are used to connect modules 20. Extensions 1920 provide a finished look between adjacent modules 20. Further, elongate end 1922 provides a finished look on the outside of the wall.

Figure 22:
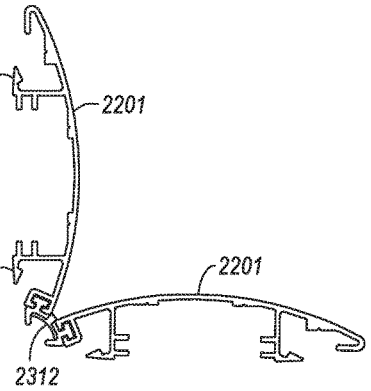
FIG. 22 is a plan view of a variance of a 90 degree connector for the present wall system.

FIG. 22 illustrates an alternative 90 degree connector. In this case, an extrusion 2201 is affixed to the end of a module 20. Two extrusions are connected using a connector 2312. Since connector 2312 is flexible, an angle greater than or less than 90 degrees is possible. In a preferred embodiment, the swing on the connector is approximately 15 degrees.

The above-described embodiments of the present invention are meant to be illustrative of preferred embodiments and are not intended to limit the scope of the present invention. Various modifications, which would be readily apparent to one skilled in the art, are intended to be within the scope of the present invention. The only limitations to the scope of the present invention are set forth in the following claims appended hereto.

What is claimed is:

[1. A movable reconfigurable wall system comprising:

a) at least one wall module having a front and rear surface and top, bottom, right side and left side edges, said at least one wall module having:

i) a vertical end frame disposed adjacent to each of said right and left side edges, each vertical end frame having a first vertically extending flange and a spaced apart second vertically extending flange thereon, each of said first vertically extending flange and said second vertically extending flange having a beaded portion, the beaded portion on one of said first vertically extending flange or said second vertically extending flange extending toward the front surface of the wall module and the beaded portion on the other of said first vertically extending flange or said second vertically extending flange extending toward the rear surface of the wall module;

ii) a plurality of horizontal stringers affixed between said vertical end frames at said right and left side edges; and iii) an aesthetic surface affixed to said stringers; and b) a removable connecting strip having a pair of spaced apart flexible arms, each arm having a beaded portion thereon, the beaded portion of one of said arms being adapted to connect releasably to the beaded portion of one of said first vertically extending flange or said second vertically extending flange on said vertical end frame and the beaded portion of the other of said arms being adapted to connect releasably to the beaded portion of a corresponding opposed vertically extending flange on a separate vertical end frame of a second wall module, a wall bracket, a finishing trim or a connection post to hold one of said first vertically extending flange or said second vertically extending flange and said opposed vertically extending flange together, the beaded portions of said first vertically extending flange or said second vertically extending flange and said opposed vertically extending flange fitting inside the arms of said connecting strip to hold said first vertically extending flange or said second vertically extending flange and said opposed vertically extending flange together thereby releasably connecting said at least one wall module to the other of said second wall module, wall bracket, finishing trim or connection post.]

[2. The movable reconfigurable wall system of claim 1, wherein said connecting strip includes a spine adapted to fit between said first vertically extending flange or said second vertically extending flange and said opposed vertically extending flange.]

[3. The movable reconfigurable wall system of claim 2, wherein said connecting strip further includes a pair of flexible fin extensions extending opposite to said flexible arms for providing a seal.]

[4. The movable reconfigurable wall system of claim 1, wherein said aesthetic surface includes a tile panel on said front surface, said rear surface, or both said front surface and said rear surface.]

[5. The movable reconfigurable wall system of claim 4, wherein each said stringer includes one or more protrusions, said reconfigurable wall system further including tile clips for affixing tiles to said one or more protrusions.]

[6. The movable reconfigurable wall system of claim 1, wherein said aesthetic surface is a single divider selected from a group consisting of substrates consisting of glass, plastic, or wood and metal.]

[7. The movable reconfigurable wall system of claim 6, wherein said stringers and end frames include a channel for receiving said divider.]

[8. The movable reconfigurable wall system of claim 1, wherein said stringers include a cantilever channel stringer, said cantilever channel stringer having: a central horizontally extending channel portion with a generally L-shaped slot, said L-shaped slot adapted to receive and engage a substantially L-shaped hook formed on a wall accessory; an upper portion having a tile support; a lower portion having a tile support; and a pair of extending webs connecting said channel portion to said upper and a lower portion.]

[9. The movable reconfigurable wall system of claim 1, wherein said system further comprises an extension frame, said extension frame including a pair of vertical extension end frames and at least one stringer, said extension frame being affixed atop of said at least one module with a spline on each end of said end frame.]

[10. The movable reconfigurable wall system of claim 1, wherein said aesthetic surface includes a slat wall, said slat wall having slats and slat wall channels for connection to slat wall accessories.]

[11. The movable reconfigurable wall system of claim 1, said system further comprising a levelling system having: a universal foot; a leveller capable of engaging said universal foot; and a structural extrusion to engage surface of said at least one module, said structural extrusion connecting to said leveller, wherein said leveller provides the sole connection between said universal foot and said module.]

[12. The movable reconfigurable wall system of claim 11, wherein said leveller comprises: a cylindrical internally threaded upper section; an internally and externally threaded middle section, said external threads matching said internally threaded upper section; and an externally threaded lower section, said externally threaded lower section matching internal threads of said middle section, wherein said middle section can be twisted to extend or contract said leveller.]

[13. The movable reconfigurable wall unit of claim 11 further comprising a base trim, said base trim attaching to said universal foot.]

[14. The movable reconfigurable wall unit of claim 1 further comprising a ceiling connection, said ceiling connection including: a ceiling track affixed to a ceiling; a horizontal upper section affixed to said module, said horizontal upper section adapted to fit about said ceiling track; a flexible gasket affixed to said horizontal upper section and extending above said horizontal upper section to contact the ceiling.]

[15. The movable reconfigurable wall unit of claim 1, wherein said wall bracket comprises:

an extrusion for connection to an existing wall in alignment with said end frame; and first and second flanges on said extrusion corresponding to said first vertically extending flange and said second vertically extending flange on said end frame and arranged in opposition thereto.]

[16. The movable reconfigurable wall unit of claim 1 further comprising a wall joint, said wall joint comprising a flexible gasket and a channel, said channel adapted to connect to a flange of said at least one module.]

[17. The movable reconfigurable wall unit of claim 1, wherein said at least one module includes curved stringers and curved aesthetic surfaces.]

[18. The movable reconfigurable wall unit of claim 1, wherein said connection post includes at least two sides having vertically extending flanges thereon corresponding to and arranged in opposition to said first and second flanges on said end frame.]

[19. The movable reconfigurable wall unit of claim 1, wherein said aesthetic surface includes a multimedia component.]

[20. The movable reconfigurable wall unit of claim 19, wherein said multimedia component is a video monitor.]

[21. The movable reconfigurable wall unit of claim 1, wherein said vertical end frame depth is extended to provide a deeper wall.]

[22. The movable reconfigurable wall unit of claim 21, wherein said deeper wall is adapted to accommodate a rear-projection video system.]

[23. The movable reconfigurable wall unit of claim 21, wherein said deeper wall is adapted to accommodate an integrated storage system.]

[24. The movable reconfigurable wall unit of claim 1, further comprising a wall mounted module for mounting to an existing wall face, said wall mounted module having:

a) vertical end brackets disposed at least at its side edges, each said vertical end frame having a vertically extending flange directed away from said existing wall face; b) a plurality of horizontal stringers affixed between said pair of vertical end brackets; and c) an aesthetic surface affixed to said stringers.]

[25. The movable reconfigurable wall unit of claim 1, further comprising a furniture system connectable to said at least one module, the furniture system having: a work surface, said work surface connectable to said stringers; and furniture legs, said furniture legs connecting to said work surface at a first end and connecting to a threaded bolt at a second end opposite said first end, said threaded bolt allowing levelling of said work surface.]

*26. A movable reconfigurable wall system comprising:*

*a) at least one wall module having a front and rear surface and top, bottom, right side and left side edges, said at least one wall module having:*

*i) a first vertical end frame disposed adjacent to the right side edge and a second vertical end frame disposed adjacent to the left side edge, each of the first and the second vertical end frames having a first vertically extending flange and a spaced apart second vertically extending flange thereon, each of said first vertically extending flange and said second vertically extending flange having a beaded portion, the beaded portion on one of said first vertically extending flange or said*

*second vertically extending flange extending toward the front surface of the wall module and the beaded portion on the other of said first vertically extending flange or said second vertically extending flange extending toward the rear surface of the wall module;*

*ii) a plurality of horizontal stringers affixed between said vertical end frames at said right and left side edges; and*

*iii) a wall tile affixed to said stringers;*

*b) a removable connecting strip having a pair of spaced apart flexible arms, each arm having a beaded portion thereon, the beaded portion of one of said arms being adapted to connect releasably to the beaded portion of one of said first vertically extending flange or said second vertically extending flange on said first or second vertical end frame and the beaded portion of the other of said arms being adapted to connect releasably to the beaded portion of a corresponding opposed vertically extending flange on a separate vertical end frame of a second wall module, a wall bracket, a finishing trim, or a connection post to hold one of said first vertically extending flange or said second vertically extending flange and said opposed vertically extending flange together, the beaded portions of said first vertically extending flange or said second vertically extending flange and said opposed vertically extending flange fitting inside the arms of said connecting strip to hold said first vertically extending flange or said second vertically extending flange and said opposed vertically extending flange together thereby releasably connecting said at least one wall module to the other of said second wall module, wall bracket, finishing trim or connection post; and*

*a leveling system having:*

*a foot;*

*a leveler engaging and supported by said foot and engaging and supporting a horizontal member in said at least one module;*

*wherein said leveler*

*(a) has a height that is capable of being adjusted and*

*(b) has a horizontal location that was established by sliding said leveler horizontally relative to, and while engaging said horizontal member and/or said foot.*

*27. The movable reconfigurable wall system of claim 26, wherein said connecting strip includes a spine adapted to stabilize said first vertically extending flange, said second vertically extending flange in connection with said connecting strip.*

*28. The movable reconfigurable wall system of claim 26, wherein said connecting strip further includes a pair of flexible fin extensions extending opposite to said flexible arms for providing a seal.*

*29. The movable reconfigurable wall system of claim 26, wherein said wall tile includes a tile panel on said front surface, said rear surface, or both said front surface and said rear surface.*

*30. The movable reconfigurable wall system of claim 29, wherein each said stringer includes one or more protrusions, said reconfigurable wall system further including tile clips for affixing tiles to said one or more protrusions.*

*31. The movable reconfigurable wall system of claim 26, wherein said wall tile is a single divider selected from a group consisting of substrates consisting of glass, plastic, or wood and metal.*

*32. The movable reconfigurable wall system of claim 31, wherein said stringers and the first and second vertical end frames include a channel for receiving said divider.*

*33. The movable reconfigurable wall system of claim 26, wherein said stringers include a cantilever channel stringer, said cantilever channel stringer having:*

*a central horizontally extending channel portion with a generally L-shaped slot, said L-shaped slot adapted to receive and engage a substantially L-shaped hook formed on a wall accessory;*

*an upper portion having a tile support;*

*a lower portion having a tile support; and*

*a pair of extending webs connecting said channel portion to said upper and a lower portion;*

*wherein said channel is accessible from outside of the wall tile.*

*34. The movable reconfigurable wall system of claim 26, wherein said system further comprises an extension frame, said extension frame including a pair of vertical extension end frames and at least one stringer, said extension frame being affixed atop of said at least one wall module with a spline affixed adjacent to a first side and a second side of the at least one wall module.*

*35. The movable reconfigurable wall system of claim 26, wherein said wall tile includes a slat wall, said slat wall having slats and slat wall channels for connection to slat wall accessories.*

*36. The movable reconfigurable wall system of claim 26, wherein said leveler comprises:*

*a cylindrical internally threaded upper section;*

*an internally and externally threaded middle section, said external threads matching said internally threaded upper section; and*

*an externally threaded lower section, said externally threaded lower section matching internal threads of said middle section, wherein said middle section can be twisted to extend or contract said leveler.*

*37. The movable reconfigurable wall unit of claim 26, further comprising a base trim, said base trim attaching to said foot.*

*38. The movable reconfigurable wall unit of claim 26, further comprising a ceiling connection, said ceiling connection including:*

*a ceiling track affixed to a ceiling;*

*a horizontal upper section affixed to said module, said horizontal upper section adapted to fit about said ceiling track; and*

*a flexible gasket affixed to said horizontal upper section and extending above said horizontal upper section to contact the ceiling.*

*39. The movable reconfigurable wall unit of claim 26, wherein said wall bracket comprises:*

*an extrusion for connection to an existing wall in alignment with at least one of the two vertical end frames; and*

*first and second flanges on said extrusion corresponding to said first vertically extending flange and said second vertically extending flange on said at least one of the two vertical end frames and arranged in opposition thereto.*

*40. The movable reconfigurable wall unit of claim 26, further comprising a wall joint, said wall joint comprising a flexible gasket and a channel, said channel adapted to connect to a flange of said at least one module.*

*41. The movable reconfigurable wall unit of claim 26, wherein said at least one module includes curved stringers and curved wall tiles.*

*42. The movable reconfigurable wall unit of claim 26, wherein said connection post includes at least two sides having vertically extending flanges thereon corresponding*

*to and arranged in opposition to said first and second flanges on at least one of the two vertical end frames.*

*43. The movable reconfigurable wall unit of claim 26, wherein said wall tile includes a multimedia component.*

*44. The movable reconfigurable wall unit of claim 43, wherein said multimedia component is a video monitor.*

*45. The movable reconfigurable wall unit of claim 26, wherein a depth associated with at least one of the vertical end frames is extended to provide a deeper wall.*

*46. The movable reconfigurable wall unit of claim 45, wherein said deeper wall is adapted to accommodate a rear-projection video system.*

*47. The movable reconfigurable wall unit of claim 46, wherein said deeper wall is adapted to accommodate an integrated storage system.*

*48. The movable reconfigurable wall unit of claim 26, further comprising:*

*a wall mounted module for mounting to an existing wall face, said wall mounted module having:*

*a) vertical end brackets disposed at least at its side edges, each of said vertical end frames having a vertically extending flange directed away from said existing wall face;*

*b) a plurality of horizontal stringers affixed between said pair of vertical end brackets; and*

*c) a wall tile affixed to said stringers.*

*49. The movable reconfigurable wall unit of claim 26, further comprising a furniture system connectable to said at least one module, the furniture system having:*

*a work surface, said work surface connectable to said stringers; and*

*furniture legs, said furniture legs connecting to said work surface at a first end and connecting to a threaded bolt at a second end opposite said first end, said threaded bolt allowing leveling of said work surface.*

*50. The movable reconfigurable wall system as recited in claim 26, further comprising:*

*an intermediate horizontal stringer affixed between said vertical end frames at said right and left side edges;*

*wherein the intermediate horizontal stringer is positioned below an upper horizontal stringer and above a lower horizontal stringer.*

*51. The movable reconfigurable wall system as recited in claim 50, wherein the removable connecting strip is recessed behind an outermost surface of the wall tile.*

*52. The movable reconfigurable wall system as recited in claim 51, wherein:*

*the intermediate horizontal stringer comprises a receiving channel extending a horizontal length of the intermediate horizontal stringer, the receiving channel configured to receive wall accessories; and*

*the removable connecting strip is recessed behind the aesthetic tile.*

*53. The movable reconfigurable wall system as recited in claim 51, wherein:*

*the intermediate horizontal stringer comprises a tile support extending a horizontal length of the intermediate horizontal stringer, the tile support connected to a tile through a snap-fit connection; and*

*the removable connecting strip is recessed behind the aesthetic tile.*

*54. The movable reconfigurable wall system as recited in claim 26, wherein the removable connecting strip is recessed behind an outermost surface of the wall tile.*

*55. The movable reconfigurable wall system as recited in claim 54, wherein the removable connecting strip is wholly recessed behind the wall tile.*

*56. The movable reconfigurable wall system of claim 26, wherein said foot comprises one or more grooves formed therein, said foot further providing an upwardly curved surface.*

*57. The movable reconfigurable wall system of claim 56, wherein said leveler comprises a non-planar base that rests upon the upwardly curved surface of said foot.*

*58. The movable reconfigurable wall system of claim 57, wherein said leveler further engages said one or more grooves of said foot.*

*59. The movable reconfigurable wall system of claim 26, wherein:*

*said foot has a length that is at least as great as the distance between said first and second vertical end frames; and*

*said foot provides a continuous, arbitrarily selectable set of horizontal connection points for said leveler along said length.*

*60. The movable reconfigurable wall system of claim 26, wherein:*

*said horizontal member has a length that is at least as great as the distance between said first and second vertical end frames; and*

*said horizontal member provides a continuous, arbitrarily selectable set of horizontal connection points for said leveler along said length.*

*61. The movable reconfigurable wall system of claim 26, wherein said leveling system further comprises:*

*a modified leveler configured to slidingly engage said horizontal member and said foot;*

*wherein said modified leveler comprises one or more tabs that prevent said modified leveler from moving inwardly along said horizontal member upon engagement of said one or more tabs against said foot.*

*62. The movable reconfigurable wall system of claim 61, wherein said leveler comprises an upper plate.*

*63. The movable reconfigurable wall system of claim 62, wherein:*

*said horizontal member provides a horizontal surface that extends from said first vertical to the second vertical; and*

*said upper plate is capable of slidably engaging said horizontal surface without vertically extending into said at least one wall module.*

*64. The movable reconfigurable wall system of claim 26, wherein:*

*said leveler comprises an upper section and an upper plate attached above said upper section;*

*said upper plate extends along said horizontal member a length that exceeds said upper section;*

*said horizontal member contacts and engages said upper plate on both an upper surface and opposing side edges of said plate simultaneously, such that said horizontal member contacts a plurality of nonparallel surfaces of said upper plate simultaneously.*

*65. The movable reconfigurable wall system of claim 64, wherein said leveler is capable of slidably engaging said horizontal member along said nonparallel surfaces simultaneously and along a continuous length of said horizontal member.*

*66. The movable reconfigurable wall system of claim 26, wherein said horizontal member comprises a lowermost extrusion of said at least one wall module.*

*67. A movable reconfigurable wall system comprising:*

*a) at least one wall module having a front and rear surface and top, bottom, right side and left side edges, said at least one wall module having:*

*i) a first vertical end frame disposed adjacent to the right side edge and a second vertical end frame disposed adjacent to the left side edge, each of the first and the second vertical end frames having a first vertically extending flange and a spaced apart second vertically extending flange thereon, each of said first vertically extending flange and said second vertically extending flange having a beaded portion, the beaded portion on one of said first vertically extending flange or said second vertically extending flange extending toward the front surface of the wall module and the beaded portion on the other of said first vertically extending flange or said second vertically extending flange extending toward the rear surface of the wall module;*

*ii) a plurality of horizontal stringers affixed between said vertical end frames at said right and left side edges; and*

*iii) a wall tile affixed to said stringers;*

*b) a removable connecting strip having a pair of spaced apart flexible arms, each arm having a beaded portion thereon, the beaded portion of one of said arms being adapted to connect releasably to the beaded portion of one of said first vertically extending flange or said second vertically extending flange on said first or second vertical end frame and the beaded portion of the other of said arms being adapted to connect releasably to the beaded portion of a corresponding opposed vertically extending flange on a separate vertical end frame of a second wall module, a wall bracket, a finishing trim, or a connection post to hold one of said first vertically extending flange or said second vertically extending flange and said opposed vertically extending flange together, the beaded portions of said first vertically extending flange or said second vertically extending flange and said opposed vertically extending flange fitting inside the arms of said connecting strip to hold said first vertically extending flange or said second vertically extending flange and said opposed vertically extending flange together thereby releasably connecting said at least one wall module to the other of said second wall module, wall bracket, finishing trim or connection post; and*

*a leveling system having:*

*a foot having one or more grooves formed therein, the foot providing an upwardly curved surface; and*

*a leveler engaging and supported by said foot, said leveler horizontally engaging and supporting a horizontal member of said at least one wall module, wherein said leveler*

*(a) has a height that is capable of being adjusted and*

*(b) has a non-planar base that rests upon the upwardly curved surface of said foot.*

*68. The movable reconfigurable wall system of claim 67, wherein said connecting strip includes a spine adapted to stabilize said first vertically extending flange, said second vertically extending flange in connection with said connecting strip.*

*69. The movable reconfigurable wall system of claim 67, wherein said connecting strip further includes a pair of flexible fin extensions extending opposite to said flexible arms for providing a seal.*

*70. The movable reconfigurable wall system of claim 67, wherein said wall tile includes a tile panel on said front surface, said rear surface, or both said front surface and said rear surface.*

*71. The movable reconfigurable wall system of claim 70, wherein each said stringer includes one or more protrusions, said reconfigurable wall system further including tile clips for affixing tiles to said one or more protrusions.*

*72. The movable reconfigurable wall system of claim 67, wherein said wall tile is a single divider selected from a group consisting of substrates consisting of glass, plastic, or wood and metal.*

*73. The movable reconfigurable wall system of claim 72, wherein said stringers and the first and second vertical end frames include a channel for receiving said divider.*

*74. The movable reconfigurable wall system of claim 73, wherein said stringers include a cantilever channel stringer, said cantilever channel stringer having:*

*a central horizontally extending channel portion with a generally L-shaped slot, said L-shaped slot adapted to receive and engage a substantially L-shaped hook formed on a wall accessory;*

*an upper portion having a tile support;*

*a lower portion having a tile support; and*

*a pair of extending webs connecting said channel portion to said upper and a lower portion;*

*wherein said channel is accessible from outside the wall tile.*

*75. The movable reconfigurable wall system of claim 67, wherein said system further comprises an extension frame, said extension frame including a pair of vertical extension end frames and at least one stringer, said extension frame being affixed atop of said at least one wall module with a spline affixed adjacent to a first side and a second side of the at least one wall module.*

*76. The movable reconfigurable wall system of claim 67, wherein said wall tile includes a slat wall, said slat wall having slats and slat wall channels for connection to slat wall accessories.*

*77. The movable reconfigurable wall system of claim 67, wherein said leveler comprises:*

*a cylindrical internally threaded upper section;*

*an internally and externally threaded middle section, said external threads matching said internally threaded upper section; and*

*an externally threaded lower section, said externally threaded lower section matching internal threads of said middle section, wherein said middle section can be twisted to extend or contract said leveler.*

*78. The movable reconfigurable wall unit of claim 67, further comprising a base trim, said base trim attaching to said foot.*

*79. The movable reconfigurable wall unit of claim 67, further comprising a ceiling connection, said ceiling connection including:*

*a ceiling track affixed to a ceiling;*

*a horizontal upper section affixed to said module, said horizontal upper section adapted to fit about said ceiling track; and*

*a flexible gasket affixed to said horizontal upper section and extending above said horizontal upper section to contact the ceiling.*

*80. The movable reconfigurable wall unit of claim 67, wherein said wall bracket comprises:*

*an extrusion for connection to an existing wall in alignment with at least one of the two vertical end frames; and*

*first and second flanges on said extrusion corresponding to said first vertically extending flange and said second vertically extending flange on said at least one of the two vertical end frames and arranged in opposition thereto.*

*81. The movable reconfigurable wall unit of claim 67, further comprising a wall joint, said wall joint comprising a flexible gasket and a channel, said channel adapted to connect to a flange of said at least one module.*

*82. The movable reconfigurable wall unit of claim 67, wherein said at least one module includes curved stringers and curved wall tiles.*

*83. The movable reconfigurable wall unit of claim 67, wherein said connection post includes at least two sides having vertically extending flanges thereon corresponding to and arranged in opposition to said first and second flanges on at least one of the two vertical end frames.*

*84. The movable reconfigurable wall unit of claim 67, wherein said wall tile includes a multimedia component.*

*85. The movable reconfigurable wall unit of claim 84, wherein said multimedia component is a video monitor.*

*86. The movable reconfigurable wall unit of claim 67, wherein a depth associated with at least one of the vertical end frames is extended to provide a deeper wall.*

*87. The movable reconfigurable wall unit of claim 86, wherein said deeper wall is adapted to accommodate a rear-projection video system.*

*88. The movable reconfigurable wall unit of claim 87, wherein said deeper wall is adapted to accommodate an integrated storage system.*

*89. The movable reconfigurable wall unit of claim 67, further comprising:*

*a wall mounted module for mounting to an existing wall face, said wall mounted module having:*

*a) vertical end brackets disposed at least at its side edges, each of said vertical end frames having a vertically extending flange directed away from said existing wall face;*

*b) a plurality of horizontal stringers affixed between said pair of vertical end brackets; and*

*c) a wall tile affixed to said stringers.*

*90. The movable reconfigurable wall unit of claim 67, further comprising a furniture system connectable to said at least one module, the furniture system having:*

*a work surface, said work surface connectable to said stringers; and*

*furniture legs, said furniture legs connecting to said work surface at a first end and connecting to a threaded bolt at a second end opposite said first end, said threaded bolt allowing leveling of said work surface.*

*91. The movable reconfigurable wall system as recited in claim 67, further comprising:*

*an intermediate horizontal stringer affixed between said vertical end frames at said right and left side edges;*

*wherein the intermediate horizontal stringer is positioned below an upper horizontal stringer and above a lower horizontal stringer.*

*92. The movable reconfigurable wall system as recited in claim 91, wherein the removable connecting strip is recessed behind the wall tile.*

*93. The movable reconfigurable wall system as recited in claim 91, wherein:*

*the intermediate horizontal stringer comprises a receiving channel extending a horizontal length of the intermediate horizontal stringer, the receiving channel configured to receive wall accessories; and*

*the removable connecting strip is recessed behind the wall tile.*

*94. The movable reconfigurable wall system as recited in claim 93, wherein:*

*the intermediate horizontal stringer comprises a tile support extending a horizontal length of the intermediate horizontal stringer, the tile support connected to a tile through a snap-fit connection; and*

*the removable connecting strip is recessed behind the wall tile.*

*95. The movable reconfigurable wall system as recited in claim 67, wherein the removable connecting strip is recessed behind an outermost surface of the wall tile.*

*96. The movable reconfigurable wall system as recited in claim 95, wherein the removable connecting strip is wholly recessed behind the wall tile.*

*97. The movable reconfigurable wall system of claim 67, wherein said leveler is capable of slidably engaging said horizontal member and/or said foot.*

*98. The movable reconfigurable wall system of claim 67, wherein said leveler is capable of slidably engaging, and positioning horizontally relative to, said foot and said horizontal member simultaneously.*

*99. The movable reconfigurable wall system of claim 67, wherein said has a horizontal location that was established by sliding said leveler horizontally relative to, and while engaging said horizontal member and/or while engaging said foot.*

*100. The movable reconfigurable wall system of claim 67, wherein said leveler further engages said one or more grooves of said foot.*

*101. The movable reconfigurable wall system of claim 67, wherein:*

*said foot has a length that is at least as great as the distance between said first and second vertical end frames; and*

*said foot provides a continuous, arbitrarily selectable set of horizontal connection points for said leveler along said length.*

*102. The movable reconfigurable wall system of claim 67, wherein:*

*said horizontal member has a length that is at least as great as the distance between said first and second vertical end frames; and*

*said horizontal member provides a continuous, arbitrarily selectable set of horizontal connection points for said leveler along said length.*

*103. The movable reconfigurable wall system of claim 67, wherein said leveling system further comprises:*

*a modified leveler configured to slidingly engage said horizontal member and said foot;*

*wherein said modified leveler comprises one or more tabs that prevent said modified leveler from moving inwardly along said horizontal member upon engagement of said one or more tabs against said foot.*

*104. The movable reconfigurable wall system of claim 67, wherein said leveler comprises an upper plate.*

*105. The movable reconfigurable wall system of claim 104, wherein:*

*said upper plate horizontally engages said horizontal member via one or more channels; and*

*said non-planar base engages said one or more grooves formed in said foot.*

*106. The movable reconfigurable wall system of claim 104, wherein:*

*said horizontal member provides a horizontal surface that extends from said first vertical to the second vertical; and*

*said upper plate is capable of slidingly engaging said horizontal surface without vertically extending into said at least one wall module.*

*107. The movable reconfigurable wall system of claim 106, wherein:*

*said leveler comprises an upper section and an upper plate attached above said upper section;*

*said upper plate extends along said horizontal member a length that exceeds said upper section;*

*said horizontal member contacts and engages said upper plate on both an upper surface and opposing side edges of said plate simultaneously, thereby contacting a plurality of nonparallel surfaces of said upper plate simultaneously.*

*108. The movable reconfigurable wall system of claim 107, wherein said leveler is capable of slidably engaging said horizontal member along said nonparallel surfaces.*

*109. The movable reconfigurable wall system of claim 67, wherein said horizontal member comprises a lowermost extrusion of said at least one wall module.*

*110. A movable reconfigurable wall system comprising:*

*a first wall module having a first vertical end frame disposed adjacent a left edge of the first wall module and a second vertical end frame disposed adjacent a right edge of the first wall module, the second vertical end frame comprising at least one vertically extending flange, said flange having a beaded portion extending therefrom;*

*a first plurality of horizontal stringers interconnecting the first vertical end frame of the first wall module and the second vertical end frame of the first wall module, the first plurality of horizontal stringers being positioned along the height of the first and second vertical end frames of the first wall module;*

*a second wall module having a first vertical end frame disposed adjacent a left edge of the second wall module and a second vertical end frame disposed adjacent a right edge of the second wall module, said first vertical end frame comprising at least one vertically extending flange, said flange having a beaded portion extending therefrom;*

*a second plurality of horizontal stringers interconnecting the first vertical end frame of the second wall module and the second vertical end frame of the second wall module, the second plurality of horizontal stringers being positioned along the height of the first and second vertical end frames of the second wall module;*

*a removable connecting strip comprising a pair of spaced apart flexible arms each having a beaded portion thereon, the connecting strip releasably connected to the beaded portion extending from the flange of the second vertical end frame of the first wall module and releasably connected to the beaded portion extending from the flange of the first vertical end frame of the second wall module, such that the removable connecting strip connects the first wall module to the second wall module;*

*a wall tile affixed to one or more of the first plurality of horizontal stringers and to one or more of the second plurality of horizontal stringers, such that the wall tile spans at least a portion of both the first wall module and the second wall module; and*

*each of the first and second wall modules further comprising a leveling system having:*

*a foot having one or more grooves formed therein, the foot providing an upwardly curved surface; and*

*a leveler engaging and supported by said foot, said leveler horizontally engaging and supporting a horizontal member of the corresponding first or second wall module;*

*wherein:*

*said leveler*

*(a) has a height that is capable of being adjusted;*

*(b) has a non-planar base that mates and rests upon the upwardly curved surface of said foot; and*

*(c) has a horizontal location that was established by sliding said leveler horizontally relative to, and while engaging, said horizontal member and/or while engaging said foot.*

*111. A movable reconfigurable wall system comprising:*

*a first wall module having a first vertical end frame disposed adjacent a left edge of the first wall module and a second vertical end frame disposed adjacent a right edge of the first wall module, the second vertical end frame comprising at least one vertically extending flange, said flange having a beaded portion extending therefrom;*

*a first plurality of horizontal stringers interconnecting the first vertical end frame of the first wall module and the second vertical end frame of the first wall module, the first plurality of horizontal stringers being positioned along the height of the first and second vertical end frames of the first wall module;*

*a second wall module having a first vertical end frame disposed adjacent a left edge of the second wall module and a second vertical end frame disposed adjacent a right edge of the second wall module, said first vertical end frame comprising at least one vertically extending flange, said flange having a beaded portion extending therefrom;*

*a second plurality of horizontal stringers interconnecting the first vertical end frame of the second wall module and the second vertical end frame of the second wall module, the second plurality of horizontal stringers being positioned along the height of the first and second vertical end frames of the second wall module;*

*a removable connecting strip comprising a pair of spaced apart flexible arms each having a beaded portion thereon, the connecting strip releasably connected to the beaded portion extending from the flange of the second vertical end frame of the first wall module and releasably connected to the beaded portion extending from the flange of the first vertical end frame of the second wall module, such that the removable connecting strip connects the first wall module to the second wall module;*

*at least one of said first plurality of horizontal stringers having a first connector, said first connector having a right edge adjacent the right edge of the first wall module;*

*at least one of said second plurality of horizontal stringers having a second connector, said second connector having a left edge adjacent the left edge of the second wall module;*

*the right edge of the first connector substantially abutting the left edge of the second connector to form a substantially continuous connector when the first wall module is connected to the second wall module;*

*a wall tile mounted to said at least one of said first plurality of horizontal stringers with said first connector or mounted to said at least one of said second plurality of horizontal stringers with said second connector; and*

*each of the first and second wall modules further comprising a leveling system having:*

*a foot having one or more grooves formed therein, the foot providing an upwardly curved surface; and*

*a leveler engaging and supported by said foot, said leveler horizontally engaging and supporting a horizontal member of the corresponding first or second wall module;*

*wherein:*

*said leveler*

*(a) has a height that is capable of being adjusted;*

*(b) has a non-planar base that rests upon the upwardly curved surface of said foot; and*

*(c) has a horizontal location that was established by sliding said leveler horizontally relative to, and while engaging, said horizontal member and/or while engaging said foot.*

*112. The movable reconfigurable wall system of claim 111, wherein said first and second connector comprises an arrow shaped bead.*

*113. A movable reconfigurable wall system comprising:*

*a first wall module having a first vertical end frame disposed adjacent a left edge of the first wall module and a second vertical end frame disposed adjacent a right edge of the first wall module, the second vertical end frame comprising at least one vertically extending flange, said flange having a beaded portion extending therefrom;*

*a first plurality of horizontal stringers interconnecting the first vertical end frame of the first wall module and the second vertical end frame of the first wall module, the first plurality of horizontal stringers being positioned along the height of the first and second vertical end frames of the first wall module;*

*a second wall module having a first vertical end frame disposed adjacent a left edge of the second wall module and a second vertical end frame disposed adjacent a right edge of the second wall module, said first vertical end frame comprising at least one vertically extending flange, said flange having a beaded portion extending therefrom;*

*a second plurality of horizontal stringers interconnecting the first vertical end frame of the second wall module and the second vertical end frame of the second wall module, the second plurality of horizontal stringers being positioned along the height of the first and second vertical end frames of the second wall module;*

*a removable connecting strip comprising a pair of spaced apart flexible arms each having a beaded portion thereon, the connecting strip releasably connected to the beaded portion extending from the flange of the second vertical end frame of the first wall module and releasably connected to the beaded portion extending from the flange of the first vertical end frame of the second wall module, such that the removable connecting strip connects the first wall module to the second wall module;*

*at least one of said first plurality of horizontal stringers having a first channel that is configured for mounting one or more wall accessories, said first channel having a left edge adjacent the left edge of the first wall module and a right edge adjacent the right edge of the first wall module;*

*at least one of said second plurality of horizontal stringers having a second channel that is configured for mounting one or more wall accessories, said second channel having a left edge adjacent the left edge of the second wall module and a right edge adjacent the right edge of the second wall module;*

*the right edge of the first channel substantially abutting the left edge of the second channel to form a substantially continuous channel when the first wall module is connected to the second wall module;*

*a wall tile being affixed to said at least one of said first plurality of horizontal stringers or to said at least one of said second plurality of horizontal stringers, wherein said first and second channel are accessible from outside of the affixed wall tile;*

*each of the first and second wall modules further comprising a leveling system having:*

*a foot having one or more grooves formed therein, the foot providing an upwardly curved surface; and*

*a leveler engaging and supported by said foot, said leveler horizontally engaging and supporting a horizontal member of the corresponding first or second wall module;*

*wherein:*

*said leveler*

*(a) has a height that is capable of being adjusted;*

*(b) has a non-planar base that mates and rests upon the upwardly curved surface of said foot; and*

*(c) has a horizontal location that was established by sliding said leveler horizontally relative to, and while engaging, said horizontal member and/or while engaging said foot.*

*114. A movable reconfigurable wall system comprising:*

*a first wall module having a first vertical end frame disposed adjacent a left edge of the first wall module and a second vertical end frame disposed adjacent a right edge of the first wall module, the second vertical end frame comprising at least one vertically extending flange, said flange having a beaded portion extending therefrom;*

*a first plurality of horizontal stringers interconnecting the first vertical end frame of the first wall module and the second vertical end frame of the first wall module, the first plurality of horizontal stringers being positioned along the height of the first and second vertical end frames of the first wall module;*

*a second wall module having a first vertical end frame disposed adjacent a left edge of the second wall module and a second vertical end frame disposed adjacent a right edge of the second wall module, said first vertical end frame comprising at least one vertically extending flange, said flange having a beaded portion extending therefrom;*

*a second plurality of horizontal stringers interconnecting the first vertical end frame of the second wall module and the second vertical end frame of the second wall module, the second plurality of horizontal stringers being positioned along the height of the first and second vertical end frames of the second wall module;*

*a removable connecting strip comprising a pair of spaced apart flexible arms each having a beaded portion thereon, the connecting strip releasably connected to the beaded portion extending from the flange of the second vertical end frame of the first wall module and releasably connected to the beaded portion extending from the flange of the first vertical end frame of the second wall module, such that the removable connecting strip connects the first wall module to the second wall module;*

*a wall tile affixed to one or more of the first plurality of horizontal stringers or to one or more of the second plurality of horizontal stringers; and*

*each of the first and second wall modules further comprising a leveling system having:*

*a foot having one or more grooves formed therein, the foot providing an upwardly curved surface; and*

*a leveler engaging and supported by said foot, said leveler horizontally engaging and supporting a horizontal member of the corresponding first or second wall module;*

*wherein:*

*said leveler*

(*a*) *has a height that is capable of being adjusted;*

(*b*) *has a non-planar base that rests upon the upwardly curved surface of said foot; and*

(*c*) *has a horizontal location that was established by sliding said leveler horizontally relative to, and while engaging, said horizontal member and/or while engaging said foot.*

*115. The movable reconfigurable wall system as recited in claim 114, further comprising a multimedia center suspended within the first wall module or within the second wall module.*

*116. The movable reconfigurable wall system as recited in claim 115, wherein a front face of the multimedia center is within the same plane as the wall tile.*

*117. The movable reconfigurable wall system as recited in claim 115, wherein the multimedia center comprises a video monitor.*

*118. The movable reconfigurable wall system as recited in claim 117, wherein a front face of the multimedia center is within the same plane as the wall tile.*

*119. The movable reconfigurable wall system as recited in claim 117, further comprising:*

*a cantilever channel extending from one or both of said first and second plurality of horizontal stringers up to an edge of the affixed wall tile;*

*wherein said cantilever channel is accessible from outside of the affixed wall tile via the edge of the affixed wall tile.*

* * * * *